US009883153B2

(12) United States Patent
Naganuma

(10) Patent No.: US 9,883,153 B2
(45) Date of Patent: Jan. 30, 2018

(54) IMAGE PROCESSING APPARATUS AND METHOD

(71) Applicant: SONY CORPORATION, Tokyo (JP)

(72) Inventor: Hiromasa Naganuma, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/318,737

(22) PCT Filed: Jun. 17, 2015

(86) PCT No.: PCT/JP2015/067423
§ 371 (c)(1),
(2) Date: Dec. 14, 2016

(87) PCT Pub. No.: WO2016/002511
PCT Pub. Date: Jan. 7, 2016

(65) Prior Publication Data
US 2017/0127027 A1 May 4, 2017

(30) Foreign Application Priority Data

Jul. 1, 2014 (JP) ................. 2014-135792

(51) Int. Cl.
H04N 5/66 (2006.01)
H04N 9/31 (2006.01)
(Continued)

(52) U.S. Cl.
CPC ........... *H04N 9/3129* (2013.01); *G09G 3/002* (2013.01); *G09G 5/10* (2013.01); *H04N 9/3147* (2013.01);
(Continued)

(58) Field of Classification Search
CPC .... H04N 9/3129; H04N 9/3147; G09G 3/002; G09G 5/10; G09G 2320/045; G09G 2320/0626; G09G 2320/0693
(Continued)

(56) References Cited

U.S. PATENT DOCUMENTS 6,570,623 B1 * 5/2003 Li ..................... H04N 9/3194
348/383
2002/0041364 A1 * 4/2002 Ioka ..................... G03B 21/005
353/69
(Continued)

FOREIGN PATENT DOCUMENTS

JP 2006-516333 A 6/2006
JP 2008-216427 A 9/2008
(Continued)

*Primary Examiner* — Michael Lee
(74) *Attorney, Agent, or Firm* — Chip Law Group

(57) ABSTRACT

The present technology relates to an image processing apparatus and a method capable of performing calibration of a correction amount in brightness correction more easily. The image processing apparatus according to the present technology performs blending calculation for correcting brightness of an image in accordance with a distance from a projection unit configured to project the image to a projection surface onto which the image is projected, and in accordance with a characteristic of the projection unit. The present technology can be applied, for example, to a projector, a camera, or an electronic apparatus including both function of a projector and a camera, a computer that controls these, and to a system in which an apparatuses having a projector and a camera are operating in cooperation.

19 Claims, 18 Drawing Sheets

(51) Int. Cl.
  *G09G 3/00* (2006.01)
  *G09G 5/10* (2006.01)
(52) U.S. Cl.
  CPC ............... *G09G 2320/045* (2013.01); *G09G 2320/0626* (2013.01); *G09G 2320/0693* (2013.01)
(58) Field of Classification Search
  USPC ....................................................... 348/750
  See application file for complete search history.

(56) References Cited

U.S. PATENT DOCUMENTS

2013/0169888 A1* 7/2013 Tannhauser .......... H04N 9/3188
    348/745
2013/0194554 A1* 8/2013 Aruga .................. G03B 21/147
    353/69

FOREIGN PATENT DOCUMENTS

| JP | 2009-260932 | A | 11/2009 |
| JP | 2010-066327 | A | 3/2010 |
| JP | 2010-197449 | A | 9/2010 |
| JP | 2010-237633 | A | 10/2010 |
| JP | 2011-188404 | A | 9/2011 |
| JP | 2011-211276 | A | 10/2011 |
| JP | 2013-074475 | A | 4/2013 |
| JP | 2013-172307 | A | 9/2013 |
| WO | 2005/036874 | A1 | 4/2005 |

* cited by examiner

IMAGE PROCESSING APPARATUS AND METHOD

CROSS REFERENCE TO RELATED APPLICATIONS

This application is a U.S. National Phase of International Patent Application No. PCT/JP2015/067423 filed on Jun. 17, 2015, which claims priority benefit of Japanese Patent Application No. JP 2014-135792 filed in the Japan Patent Office on Jul. 1, 2014. Each of the above-referenced applications is hereby incorporated herein by reference in its entirety.

TECHNICAL FIELD

The present technology relates to an image processing apparatus and a method, particularly to an image processing apparatus and a method capable of performing calibration of a correction amount in brightness correction more easily.

BACKGROUND ART

There is a known method of projecting one image by allowing projection images projected from a plurality of projectors to partially or entirely overlap with each other. When brightness of the projection image is uniform, an overlapping portion of the projection images (also referred to as an overlap region) might have brightness being different from other regions. To cope with this, brightness correction needs to be performed for these overlap regions. Accordingly, methods for performing brightness correction of such overlap regions have been proposed (for example, refer to Patent Documents 1 to 3).

The methods described in Patent Documents 1 to 3, however, need manual calibration of brightness correction amount by a user, and the calibration needs complicated operation. Therefore, these methods are not suitable for use in the calibration after the start of system operation.

CITATION LIST

Patent Document

Patent Document 1: JP 2011-188404 A
Patent Document 2: JP 2010-237633 A
Patent Document 3: JP 2009-260932 A

SUMMARY OF THE INVENTION

Problems to be Solved by the Invention

A light source such as a projector, however, is subject to aging, and thus brightness of the projection image might change depending on the state of the aging. For this reason, calibration of brightness correction amount at shipment or installation would not be sufficient because image quality might deteriorate with the aging. Accordingly, a calibration method capable of easily performing calibration after the start of operation has been demanded.

The present technology is provided in view of this circumstance and intended to achieve calibration of correction amount in brightness correction more easily.

Solutions to Problems

One aspect of the present technology is an image processing apparatus including a blending calculation unit configured to perform blending calculation for correcting brightness of an image in accordance with a distance from a projection unit configured to project the image to a projection surface onto which the image is projected, and in accordance with a characteristic of the projection unit.

The blending calculation unit can perform the blending calculation for each of projection images, which are projected onto the projection surfaces by a plurality of projection units, at least partially overlapping with each other.

The blending calculation unit can perform the blending calculation in accordance with the distance from the projection unit to the projection surface, using mixing ratio information related to a mixing ratio of each of the images, regarding a region in which the projection images overlap with each other.

It is possible to configure such that the mixing ratio information is map information representing the mixing ratio for each of pixels.

The blending calculation unit can perform the blending calculation using the mixing ratio information in a uniform perceptual color space.

The image processing apparatus further includes a mixing ratio information generation unit configured to generate the mixing ratio information, and the blending calculation unit can perform the blending calculation using the information generated by the mixing ratio information generation unit.

The image processing apparatus further includes a mixing ratio information correction unit configured to correct the mixing ratio information in accordance with the characteristic of the projection unit, and the blending calculation unit can perform the blending calculation using the mixing ratio information corrected by the mixing ratio information correction unit.

The image processing apparatus further includes a correction information generation unit configured to generate correction information for correcting the mixing ratio information in accordance with the characteristic of the projection unit, and the mixing ratio information correction unit can correct the mixing ratio information using the correction information generated by the correction information generation unit.

It is possible to configure such that the correction information is map information representing a correction value of the mixing ratio for each of pixels.

The image processing apparatus can further include a luminance information correction unit configured to correct luminance information related to brightness of the image for each of the projection units on the basis of the image for which brightness has been corrected by the blending calculation performed by the blending calculation unit.

It is possible to configure such that the luminance information is information related to brightness of the image determined on the basis of the distance from the projection unit to the projection surface.

It is possible to configure such that the luminance information is map information representing brightness of the image for each of pixels.

The image processing apparatus can further include an image correction unit configured to correct brightness of the image to be projected, using the luminance information corrected by the luminance information correction unit.

The image correction unit can correct brightness of the image in the uniform perceptual color space.

The image processing apparatus can further include a projection unit configured to project the image for which brightness has been corrected by the image correction unit.

The image processing apparatus further includes a luminance information generation unit configured to generate the luminance information on the basis of the distance from the projection unit to the projection surface, and the luminance information correction unit can correct the luminance information generated by the luminance information generation unit.

The image processing apparatus further includes a distance calculation unit configured to calculate the distance from the projection unit to the projection surface on the basis of the captured image of the projection image projected onto the projection surface, and the luminance information generation unit can generate the luminance information on the basis of the distance from the projection unit to the projection surface, calculated by the distance calculation unit.

The distance calculation unit can calculate the distance from the projection unit to the projection surface on the basis of the captured image obtained by imaging by an imaging unit provided in the vicinity of the projection unit.

The image processing apparatus further includes the imaging unit, and the distance calculation unit can calculate the distance from the projection unit to the projection surface on the basis of the captured image obtained by imaging by an imaging unit.

Furthermore, another aspect of the present technology is an image processing method including performing blending calculation for correcting brightness of an image in accordance with a distance from a projection unit configured to project the image to a projection surface onto which the image is projected, and in accordance with a characteristic of the projection unit.

According to one aspect of the present technology, blending calculation is performed for correcting brightness of an image in accordance with a distance from the projection unit configured to project the image to a projection surface onto which the image is projected, and in accordance with a characteristic of the projection unit.

Effects of the Invention

According to the present technology, it is possible to perform processing on an image to be projected. Furthermore, according to the present technology, it is possible to perform calibration of the correction amount in brightness correction more easily.

MODE FOR CARRYING OUT THE INVENTION

Figure 1:
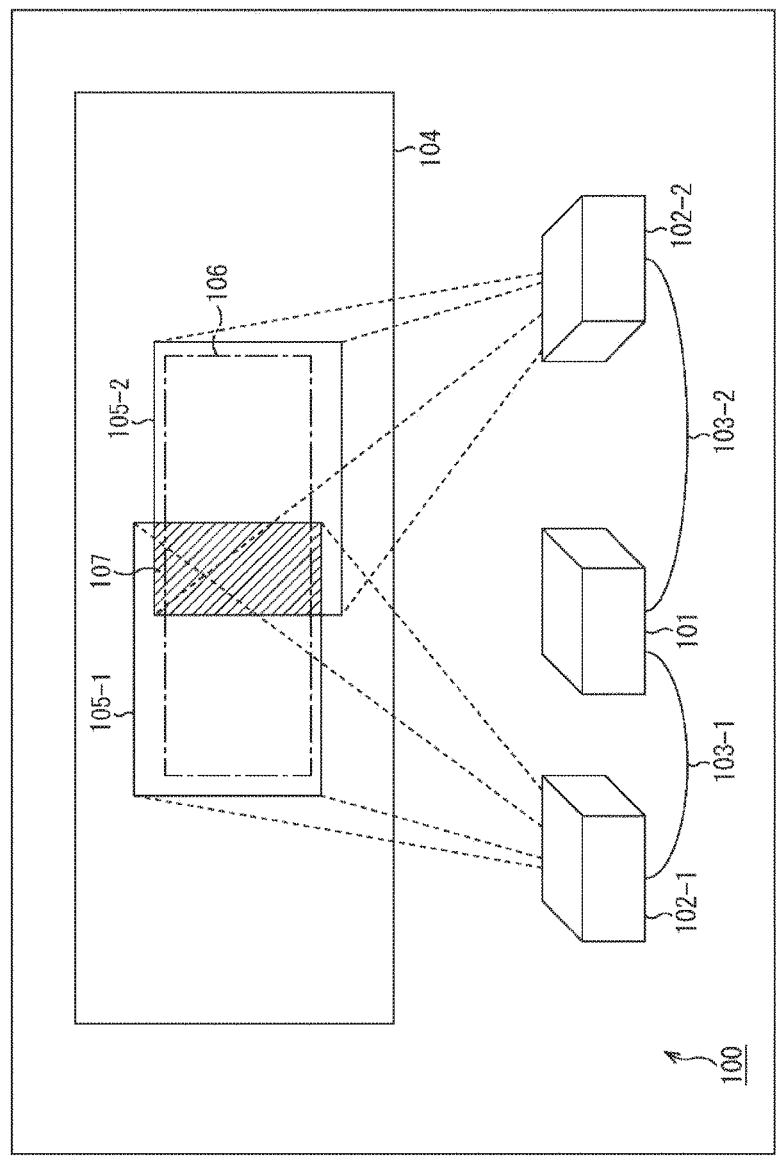
FIG. 1 is a diagram illustrating an exemplary main configuration of a projection imaging system.

Hereinafter, embodiments of the present disclosure (hereinafter, embodiment(s)) will be described. Note that description will be presented in the following order.

1. First Embodiment (Projection Imaging System)

1. First Embodiment

<Overlap Region and Brightness Correction>

There is a known method of projecting one image by allowing projection images projected from a plurality of projectors to partially or entirely overlap with each other. When brightness of the projection image is uniform, an overlapping portion of the projection images (also referred to as an overlap region) might have brightness being different from other regions. To cope with this, brightness correction needs to be performed for these overlap regions. Accordingly, methods for performing brightness correction of the overlap regions as described in Patent Documents 1 to 3 have been proposed.

Meanwhile, since there are variations in operation modes and conditions, such as specification of and the number of projectors to be used, installation location of each of the projectors, and the distance with the projection surface, depending on individual systems, it is necessary to perform setting (namely, also referred to as calibration) on the correction amount in brightness correction for individual systems. Timing of performing the calibration can be assumed to be not only at shipment (installation) of the system but also after the start of system operation. In a case where calibration is performed after the start of operation, the calibration is typically performed periodically, or non-periodically for a plurality of times, during system operation or suspension, and thus, it would be desirable that the calibration can be performed more easily and promptly.

The methods described in Patent Documents 1 to 3, however, need manual calibration of brightness correction amount by a user, and the calibration needs complicated operation. Therefore, these methods are not suitable for use in the calibration after the start of system operation.

A light source such as a projector, however, is subject to aging, and thus brightness of the projection image might change depending on the state of the aging. For this reason, calibration of brightness correction amount at shipment would not be sufficient because image quality might deteriorate with the aging. Accordingly, there is a demand for a calibration method that can be implemented more easily.

As a method for detecting brightness correction, an exemplary method would be a correction method using image processing performed on the basis of an image captured with a camera that can capture a general view. In this case, however, it is necessary to install the camera at a position where general view can be obtained, such as audience seats or front of the screen, in addition to the projector, making it difficult to perform calibration easily.

Moreover, with this method, brightness correction accuracy for the overlap region depends on the performance of the general-view camera, and thus, results of brightness correction might be significantly affected by camera sensor performance. In short, accuracy of calibration of brightness correction amount depends on the camera performance. Accordingly, in order to perform calibration while maintaining high accuracy in brightness correction, the camera is required to obtain a captured image with higher image quality.

Unfortunately, while projectors are typically used for projection in dark places, it would be more difficult to capture a high quality image with image sensors in darker places. Therefore, in order to perform calibration while maintaining high accuracy in brightness correction, the camera is required to have a high performance enough to capture an image with high image quality in such a dark place, and thus, it is not easy to achieve this performance with low cost.

<Calibration of Brightness Correction Amount>

Accordingly, blending calculation is performed for correcting brightness of the image in accordance with a distance from a projection unit configured to project an image to a projection surface onto which the image is projected, and in accordance with a characteristic of the projection unit.

According to this calculation, it is possible to perform calibration of the correction amount in brightness correction more easily.

Note that it is allowable to perform the blending calculation for each of projection images, which are projected on the projection surfaces by a plurality of projection units, at least partially overlapping with each other.

Moreover, it is allowable to perform the blending calculation in accordance with the distance from the projection unit to the projection surface, by using mixing ratio information related to a mixing ratio of each of the images, on a region in which the projection images overlap with each other.

Note that it would be allowable to configure such that the mixing ratio information is map information representing the mixing ratio for each of pixels.

Alternatively, it is allowable to perform the blending calculation using the mixing ratio information in a uniform perceptual color space.

It is allowable to generate the mixing ratio information. Subsequently, it is allowable to perform the blending calculation using the generated mixing ratio information.

It is allowable to correct the mixing ratio information in accordance with the characteristic of the projection unit. Subsequently, it is allowable to perform the blending calculation using the corrected mixing ratio information.

It is allowable to generate correction information to correct the mixing ratio information in accordance with the characteristic of the projection unit. Subsequently, it is allowable to correct the mixing ratio information using the generated correction information.

It is allowable to configure such that the correction information is map information representing a correction value of the mixing ratio for each of pixels.

It is allowable to correct luminance information related to brightness of the image for each of the projection units on the basis of the image for which brightness has been corrected by the blending calculation.

It is allowable to configure such that the luminance information is information related to brightness of the image determined on the basis of the distance from the projection unit to the projection surface.

It is allowable to configure such that the luminance information is map information representing brightness of the image for each of pixels.

It is allowable to correct brightness of the image to be projected, using the corrected luminance information.

Alternatively, it is allowable to correct brightness of the image in the uniform perceptual color space.

It is allowable to further provide a projection unit configured to project the image for which brightness has been corrected.

It is allowable to generate the luminance information on the basis of the distance from the projection unit to the projection surface. Subsequently, it would be allowable to correct the generated luminance information.

It is allowable to calculate the distance from the projection unit to the projection surface on the basis of the captured image of the projection image projected onto the projection surface. Subsequently, it is allowable to generate the luminance information on the basis of the calculated distance from the projection unit to the projection surface.

It is allowable to calculate the distance from the projection unit to the projection surface on the basis of the captured image obtained by imaging by an imaging unit provided in the vicinity of the projection unit.

It is allowable to further provide the imaging unit. Subsequently, it is allowable to calculate the distance from the projection unit to the projection surface on the basis of the captured image obtained by imaging by the imaging unit.

<Projection Imaging System>

FIG. 1 illustrates an exemplary main configuration of a projection imaging system employing a control unit, as one embodiment of the image processing apparatus in which the present technology has been applied. A projection imaging system 100 illustrated in FIG. 1 is a system that projects an image. The projection imaging system 100 can project one image or a plurality of related images, for example, using (in cooperation) a plurality of projection apparatuses (projection imaging apparatuses) as described above. As illustrated in FIG. 1, the projection imaging system 100 includes a control unit 101, a projection imaging apparatus 102-1 and a projection imaging apparatus 102-2, and a communication cable 103-1 and a communication cable 103-2.

The control unit 101 is connected to the projection imaging apparatus 102-1 via the communication cable 103-1, and controls operation of the projection imaging apparatus 102-1 while communicating with the projection imaging apparatus 102-1. Additionally, the control unit 101 is connected to the projection imaging apparatus 102-2 via the communication cable 103-2, and controls operation of the projection imaging apparatus 102-2 while communicating with the projection imaging apparatus 102-2.

Additionally, for example, the control unit 101 performs processing related to calibration of the correction amount in brightness correction for the projection image of the projection imaging apparatus 102-1 and the projection imaging apparatus 102-2.

The projection imaging apparatus 102-1 includes a projection function and can project an image on a screen 104. Additionally, the projection imaging apparatus 102-1 has also an imaging function, and can image a projection image projected on the screen 104. In short, the projection imaging apparatus 102-1 includes a projection unit having a projection function, and an imaging unit having an imaging function, in the vicinity of the projection unit.

The projection imaging apparatus 102-2 is an apparatus similar to the projection imaging apparatus 102-1 having similar configurations and functions, to the projection imaging apparatus 102-1. Each of the projection imaging apparatus 102-1 and the projection imaging apparatus 102-2 will be referred to as the projection imaging apparatus 102 in a case where there is no need to describe the two apparatuses separately.

Moreover, the communication cable 103-1 is, for example, a cable compliant with High-Definition Multimedia Interface (HDMI) (registered trademark). Note that the communication cable 103 may of course be compliant with any communication standard including, for example, the DisplayPort, and standards other than the HDMI (registered trademark).

The communication cable 103-2 is a communication medium compliant with the standard similar to the case of the communication cable 103-1. Hereinafter, each of the communication cable 103-1 and the communication cable 103-2 will be referred to as the communication cable 103 in a case where there is no need to describe the two cables separately.

The screen 104 is an exemplary surface (projection surface) onto which the projection imaging apparatus 102 projects an image. The screen 104 may be either a flat surface or a curved surface. For example, the surface of the screen 104 may include irregularities. Moreover, the screen 104 may have any color. Note that instead of the screen 104, a predetermined three-dimensional structure (e.g., building, wall, floor, ceiling, furniture, small article, creature, or the like) may be used as a projection surface.

The control unit 101 and the projection imaging apparatus 102 are interconnected via the communication cable 103 and capable of exchanging information (capable of performing communication). Moreover, the projection imaging apparatuses 102 can exchange information (can communicate) with each other via the communication cable 103.

For example, the control unit 101 can project an image onto the screen 104 by controlling the projection imaging apparatus 102-1 and the projection imaging apparatus 102-2. In FIG. 1, a projection image 105-1 represents a projection image projected on the screen 104 by the projection imaging apparatus 102-1, and a projection image 105-2 represents a projection image projected on the screen 104 by the projection imaging apparatus 102-2. Hereinafter, each of the projection image 105-1 and the projection image 105-2 will be referred to as the projection image 105 in a case where there is no need to describe the two images separately.

As illustrated in FIG. 1, each of the projection imaging apparatus 102-1 and the projection imaging apparatus 102-2 is installed at a position and in a direction that would form one region (projection region) by combining one projection image 105 with the other projection image 105. By forming one projection region using each of the projection images 105 in this manner, it is possible, for example, to project an image 106 larger than each of the projection images 105, as illustrated in a one-dot chain line in FIG. 1. In short, the control unit 101 can cause each of the projection imaging apparatuses 102 to operate in cooperation to achieve projection of a projection image larger than the projection image 105.

Note that, as illustrated in FIG. 1, each of the projection imaging apparatus 102-1 and the projection imaging apparatus 102-2 are installed such that one projection image 105 partially overlaps with the other projection image 105. A hatched portion illustrated in FIG. 1 represents the region (overlap region) in which the projection images 105 overlap with each other. In practice, it is difficult to arrange each of the projection images 105 without space and without overlapping. Therefore, by providing an overlap region 107 as such, it is possible to form one projection region more easily. In other words, it is possible to project the larger image 106 more easily.

The overlap region 107, however, receives projection of the plurality of projection images 105, and thus, might become brighter compared with other regions on which the single projection image 105 is projected. Generation of uneven brightness would deteriorate projection image quality, when the image is viewed by the user.

To cope with this, the projection imaging system 100 (including the control unit 101 and the projection imaging apparatus 102) performs brightness correction on the projection image so as to reduce such uneven brightness. In order to achieve this, calibration is needed for the correction amount in brightness correction as described above. At this time, in order to achieve calibration of brightness correction amount more easily, the projection imaging system 100 causes an imaging unit of each of the projection imaging apparatuses 102 to capture a projection image and performs calibration using the captured image.

Note that the captured image is not used for determination of brightness of the projection image, but used to generate depth information of the projection surface (for example, the screen 104), namely, information such as the distance from the projection imaging apparatus 102 (projection unit). The generated depth information is used in calibration of brightness correction amount. Details will be described below.

<Control Apparatus>

Figure 2:
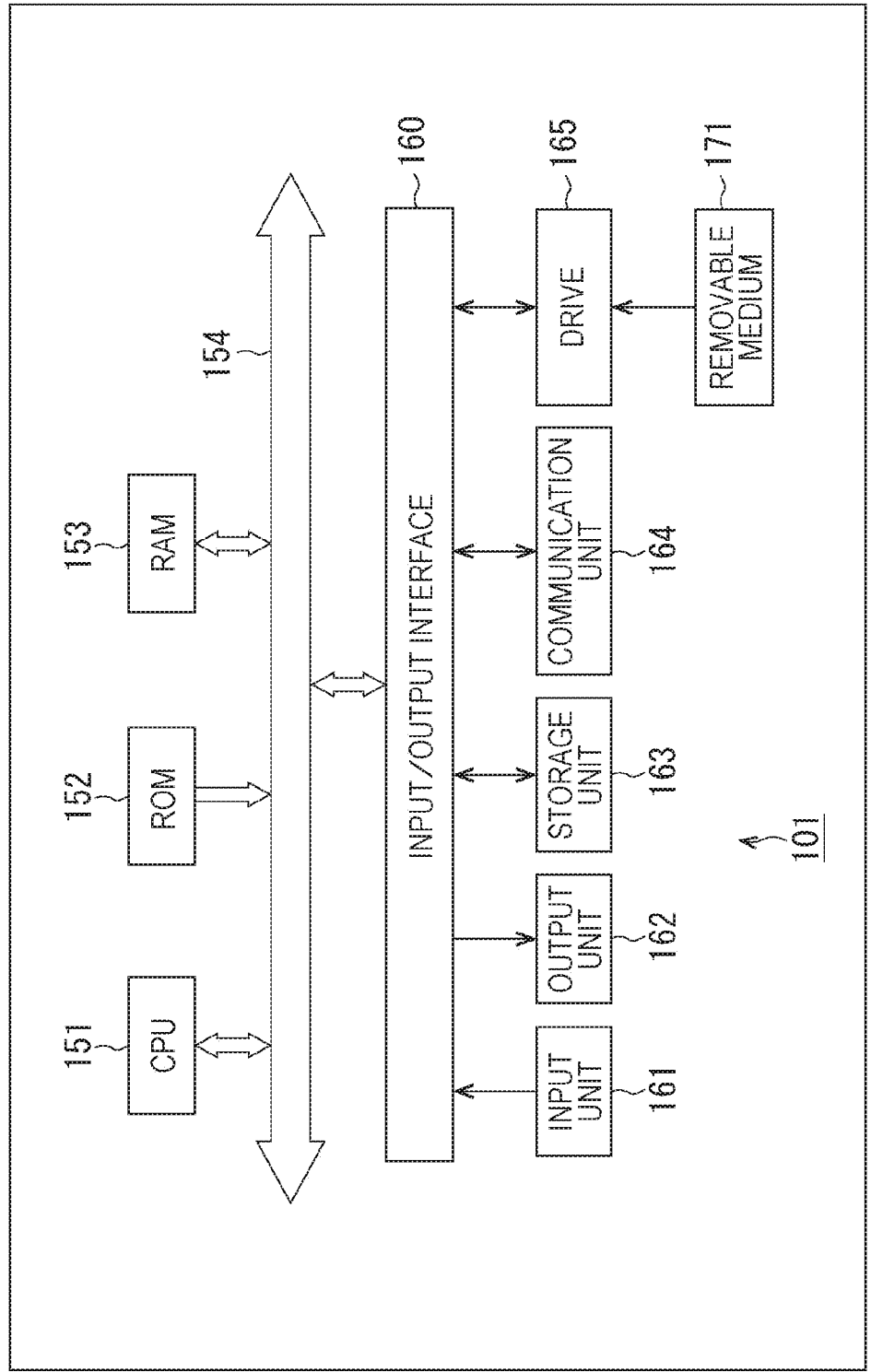
FIG. 2 is a block diagram illustrating an exemplary main configuration of a control unit.

FIG. 2 is a diagram illustrating an exemplary main configuration of the control unit 101 as one embodiment of an information processing apparatus to which the present technology is applied.

As illustrated in FIG. 2, on the control unit 101, a central processing unit (CPU) 151, a read only memory (ROM) 152, a random access memory (RAM) 153 are interconnected with each other via a bus 154.

Also an input/output interface 160 is connected to the bus 154. The input/output interface 160 is connected with an input unit 161, an output unit 162, a storage unit 163, a communication unit 164, and a drive 165.

The input unit 161 includes an input device that receives external information such as user input. For example, the input unit 161 includes an operation button, a touch panel, a camera, a microphone, and an input terminal. Alternatively, it is also allowable to configure such that the input unit 161 includes various sensors such as an acceleration sensor, an optical sensor, a temperature sensor.

The output unit 162 includes an output device that outputs information such as an image and sound. For example, the output unit 162 includes a display, a speaker, and an output terminal.

An exemplary storage unit 163 includes a hard disk, a RAM disk, and a non-volatile memory. An exemplary communication unit 164 may be a network interface. For example, the communication unit 164 is connected to the communication cable 103 and communicates with other apparatuses connected via the communication cable 103. The drive 165 drives a removable medium 171 including a magnetic disk, an optical disk, a magneto-optical disk, or a semiconductor memory.

The CPU 151 performs various types of processing by, for example, loading a program stored in the storage unit 163 via the input/output interface 160 and the bus 154 onto the RAM 153 and executing the program. The RAM 153 also stores data, or the like, appropriately, that are needed when the CPU 151 executes various types of processing.

The program executed by the CPU 151 can be stored, for example, in a removable medium 171 as a package medium and be supplied to the control unit 101. In this case, the program can be installed in the storage unit 163 via the input/output interface 160, by attaching the removable medium 171 to the drive 165.

Alternatively, the program can be provided to the control unit 101 via a wired or wireless transmission medium including a LAN, an Internet, and digital satellite broadcasting. In this case, the program can be received at the communication unit 164 via the wired or wireless transmission medium and be installed in the storage unit 163.

Alternatively, the program can be installed in the ROM 152 or the storage unit 163 beforehand.

<Functional Blocks>

Figure 3:
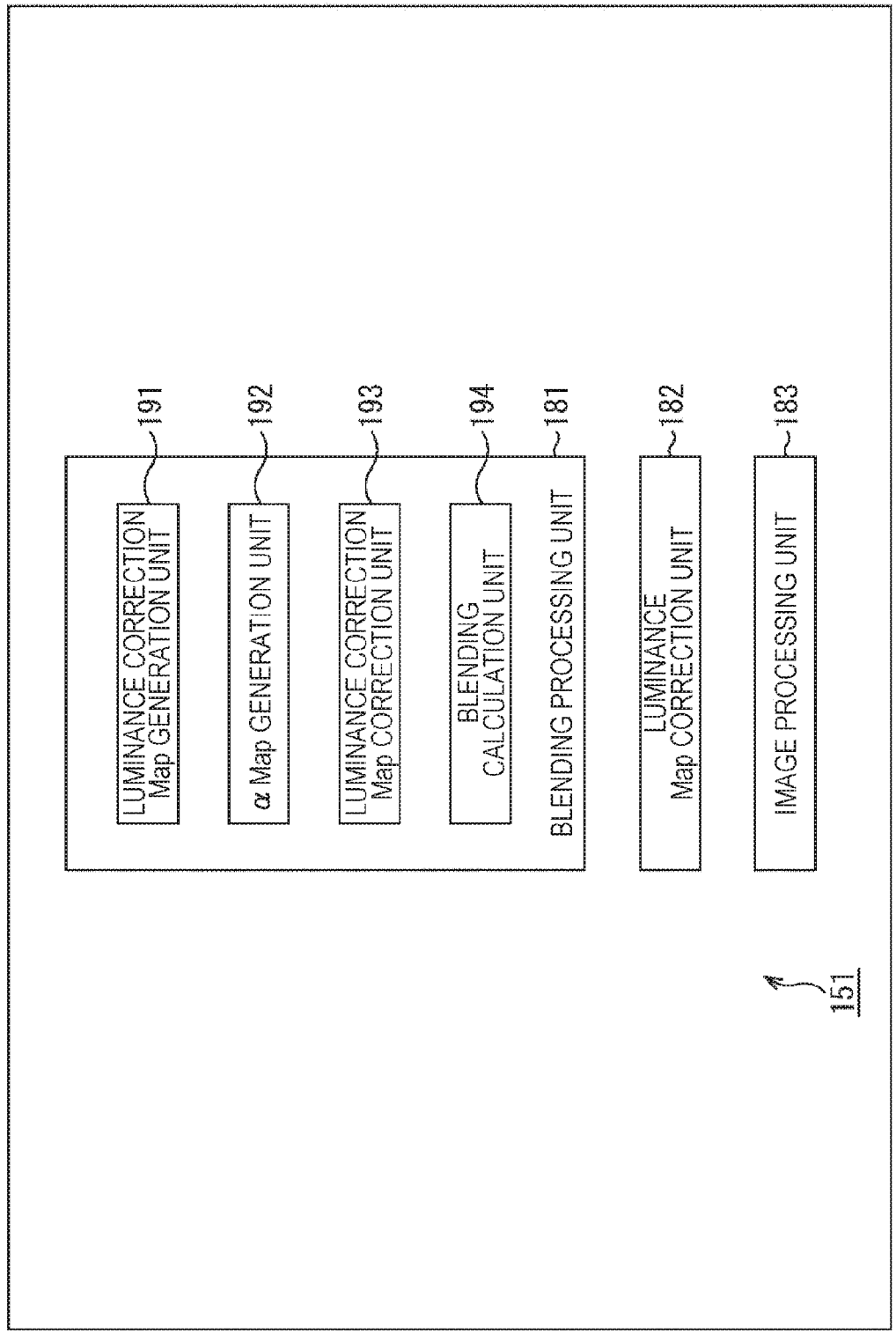
FIG. 3 is a functional block diagram illustrating an exemplary configuration of main functions implemented on a CPU.

The CPU 151 of the control unit 101 implements various functions by executing programs. FIG. 3 is a functional block diagram illustrating an exemplary configuration of main functions implemented by the CPU 151.

As illustrated in FIG. 3, the CPU 151 includes functional blocks such as a blending processing unit 181, a luminance map correction unit 182, and an image processing unit 183. The blending processing unit 181 performs processing related to mixing (blending) of the projection images 105 with each other in the overlap region 107. The luminance map correction unit 182 performs processing related to correction of luminance map as setting information that specifies brightness at projection of the image, for each of the pixels. The image processing unit 183 performs processing related to image processing on the image to be projected.

The blending processing unit 181 includes a luminance correction map generation unit 191, an α map generation unit 192, a luminance correction map correction unit 193, and a blending calculation unit 194.

The luminance correction map generation unit 191 performs processing related to generation of the luminance correction map as correction information for correcting the α map. The α map generation unit 192 performs processing related to generation of the α map representing the mixing ratio of each of the projection images 105, for each of the pixels, in the overlap region 107. The luminance correction map correction unit 193 performs processing related to correction of the α map generated by the α map generation unit 192 using the luminance correction map generated by the luminance correction map generation unit 191. The blending calculation unit 194 performs processing related to blending of the projection images 105 with each other using the α map corrected by the luminance correction map correction unit 193.

<External View of Projection Imaging Apparatus>

Figure 4:
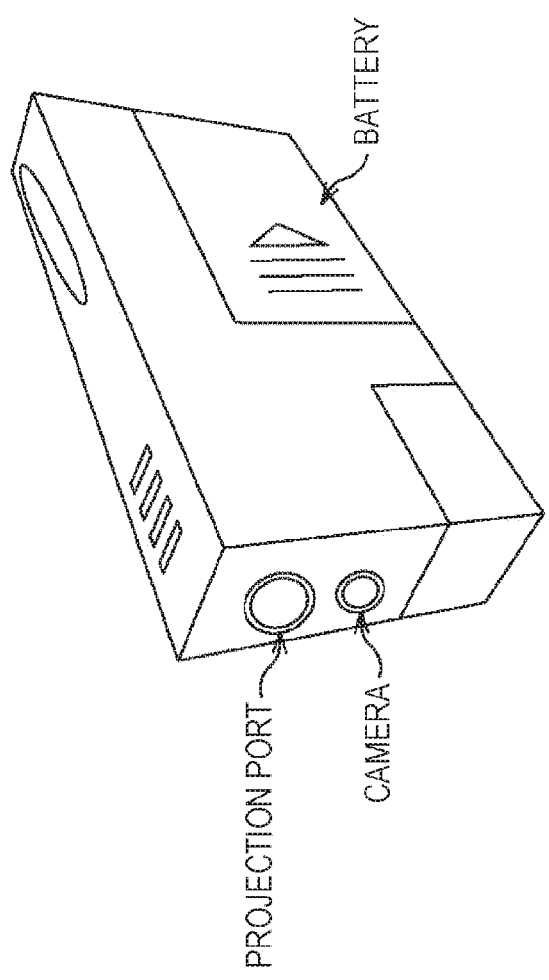
FIG. 4 is a diagram illustrating an exemplary external view of a projection imaging apparatus.

FIG. 4 illustrates an exemplary external view of the projection imaging apparatus 102. The projection imaging apparatus 102 includes the projection unit and the imaging unit, as described above. In a housing of the projection imaging apparatus 102, there are optical devices such as a projection port (lens mechanism) for projecting an image, and a camera (lens mechanism) for imaging an object. Additionally, the projection imaging apparatus 102 may have any size, for example, may be a mobile-type (small size) apparatus. In this case, it is allowable to provide a battery on the housing of the projection imaging apparatus 102, as illustrated in FIG. 4. With the battery, it is possible to drive the projection imaging apparatus 102 without any external power supply, and thus, to enhance flexibility of installation location.

<Projection Imaging Apparatus>

Figure 5:
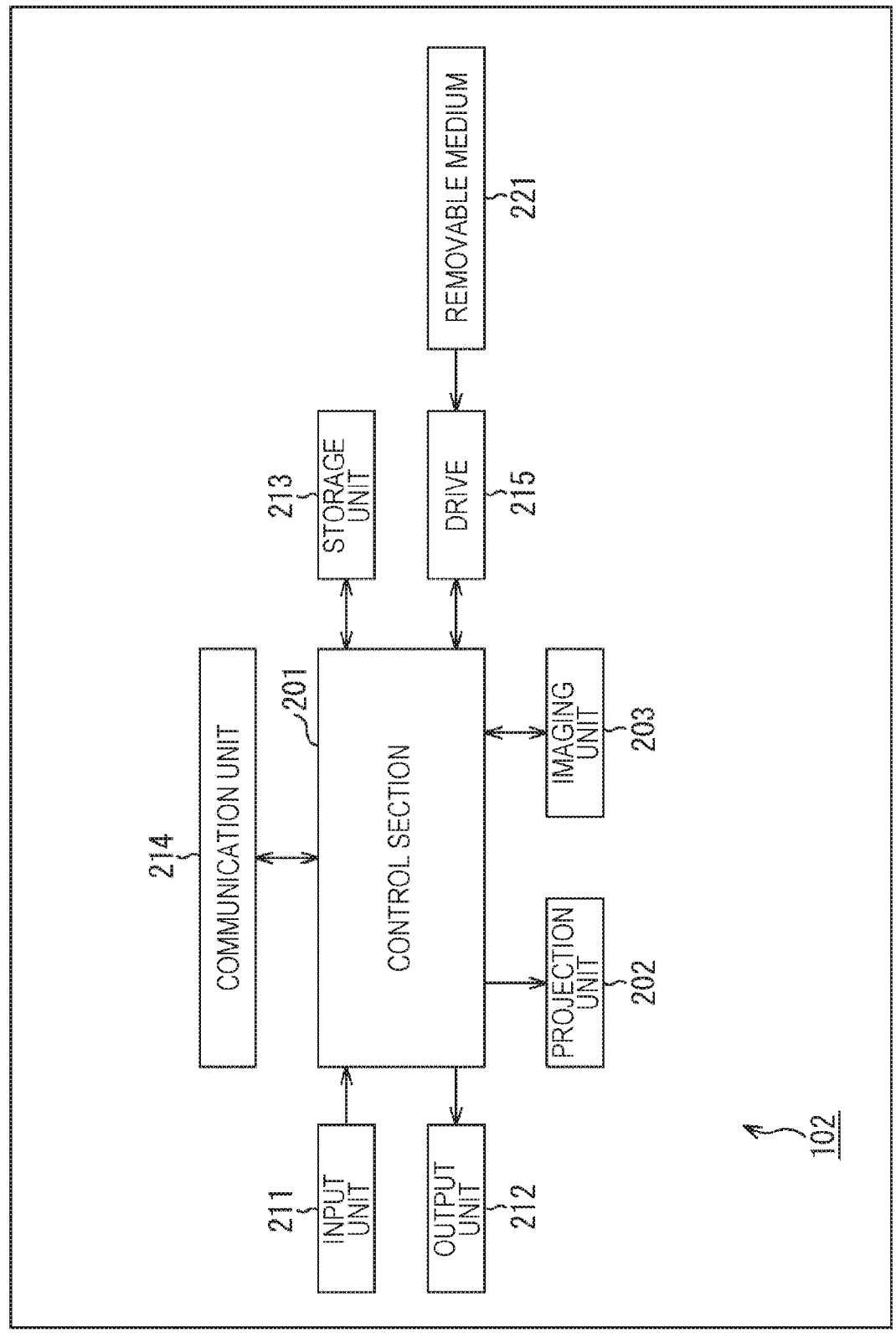
FIG. 5 is a block diagram illustrating an exemplary main configuration of a projection imaging apparatus.

FIG. 5 is a block diagram illustrating an exemplary main configuration of the projection imaging apparatus 102.

As illustrated in FIG. 5, the projection imaging apparatus 102 includes a control section 201, a projection unit 202, an imaging unit 203, an input unit 211, an output unit 212, a storage unit 213, a communication unit 214, and a drive 215.

The control section 201 is formed with, for example, a CPU, a ROM, and RAM, controls individual processing units within the apparatus, and executes various types of processing such as image processing, needed for the specific control. The projection unit 202 performs processing related to image projection, under the control of the control section 201. For example, the projection unit 202 projects an image supplied from the control section 201 onto the outside (e.g. screen 104) of the projection imaging apparatus 102. In short, the projection unit 202 implements a projection function.

The projection unit 202 projects an image by using laser beam as a light source and scanning the laser beam with a MEMS mirror. Of course, the light source for the projection unit 202 may be any type, namely, not only the laser beam but also a light source employing an LED or xenon may be employed. Details of the projection unit 202 will be detailed below.

Under the control of the control section 201, the imaging unit 203 images an object outside the apparatus, generates a captured image, and supplies the captured image to the control section 201. In short, the imaging unit 203 implements an imaging function. For example, the imaging unit 203 images a projection image projected by the projection unit 202 onto the screen 104.

The input unit 211 includes an input device that receives external information such as user input For example, the input unit 211 includes an operation button, a touch panel, a camera, a microphone, and an input terminal. Additionally, it is also allowable to include various sensors such as an acceleration sensor, an optical sensor, a temperature sensor, in the input unit 211.

The output unit 212 includes an output device that outputs information such as an image and sound. For example, the output unit 212 includes a display, a speaker, and an output terminal.

An exemplary storage unit 213 includes a hard disk, a RAM disk, and a non-volatile memory. An exemplary communication unit 214 may be a network interface. For example, the communication unit 214 is connected to the communication cable 103 and communicates with other apparatuses (e.g. the control unit 101, and other projection imaging apparatuses 102) connected via the communication cable 103. The drive 215 drives a removable medium 221, that is, for example, a magnetic disk, an optical disk, a magneto-optical disk, or a semiconductor memory.

The control section 201 performs various types of processing by executing, for example, a program stored in the storage unit 213 after loading the program onto the incorporated RAM. The RAM also stores data, or the like, appropriately, that are needed when the control section 201 executes various types of processing.

The program executed by the control section 201 can be stored, for example, in the removable medium 221 as a package medium and be supplied to the projection imaging apparatus 102. In this case, the program can be installed in the storage unit 213 by attaching the removable medium 221 to the drive 215.

Alternatively, the program can be supplied to the projection imaging apparatus 102 via a wired or wireless transmission medium including a LAN, an Internet, and digital satellite broadcasting. In this case, the program can be received at the communication unit 214 via a wired or wireless transmission medium and be installed in the storage unit 213.

Alternatively, the program can also be installed beforehand in the ROM or the storage unit 213, incorporated in the control section 201.

The projection imaging apparatus 102-1 and the projection imaging apparatus 102-2 have this type of configuration.

<Projection Unit>

Figure 6:
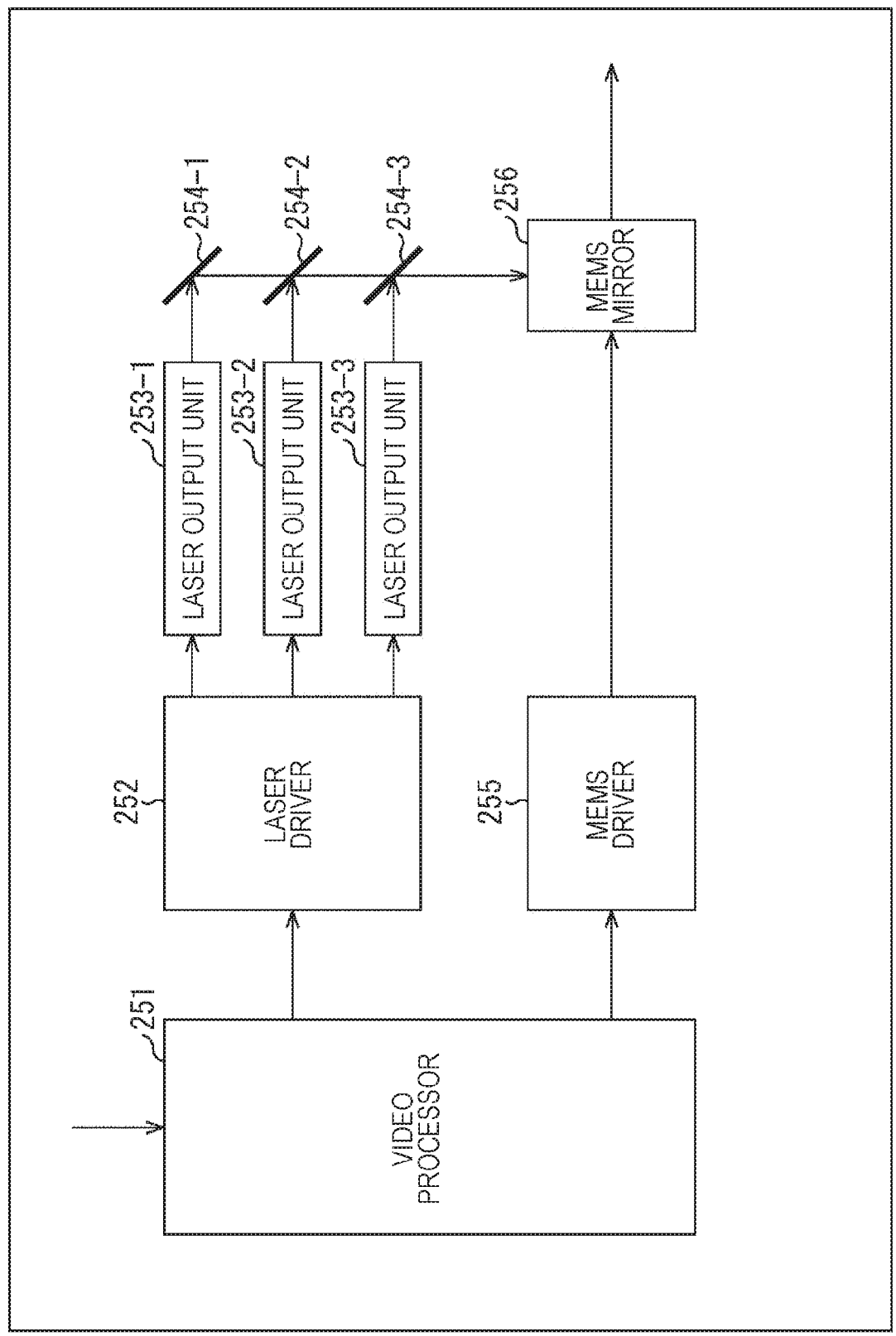
FIG. 6 is a block diagram illustrating an exemplary main configuration of a projection unit.

FIG. 6 is a block diagram illustrating an exemplary main configuration of the projection unit 202. As illustrated in FIG. 6, the projection unit 202 includes a video processor 251, a laser driver 252, a laser output unit 253-1, a laser output unit 253-2, a laser output unit 253-3, a mirror 254-1, a mirror 254-2, a mirror 254-3, a micro electro mechanical system (MEMS) driver 255, and, a MEMS mirror 256.

The video processor 251 retains an image supplied from the control section 201 and performs necessary image processing on the image. The video processor 251 supplies the image to be projected, to the laser driver 252 and the MEMS driver 255.

The laser driver 252 controls the laser output unit 253-1 to the laser output unit 253-3 so as to project the image supplied from the video processor 251. The laser output unit 253-1 to the laser output unit 253-3 output laser beam having mutually different colors (wavelength bands), for example, red, blue, green. In short, the laser driver 252 controls laser output for each of the colors so as to project the image supplied from the video processor 251. Note that each of the laser output unit 253-1 to the laser output unit 253-3 will be referred to as the laser output unit 253 in a case where there is no need to describe the three units separately.

The mirror 254-1 reflects the laser beam output from the laser output unit 253-1 and guides the reflected light to the MEMS mirror 256. The mirror 254-2 reflects the laser beam output from the laser output unit 253-2 and guides the reflected light to the MEMS mirror 256. The mirror 254-3 reflects the laser beam output from the laser output unit 253-3 and guides the reflected light to the MEMS mirror 256. Note that each of the mirror 254-1 to the mirror 254-3 will be referred to as the mirror 254 in a case where there is no need to describe the three mirrors separately.

Figure 7:
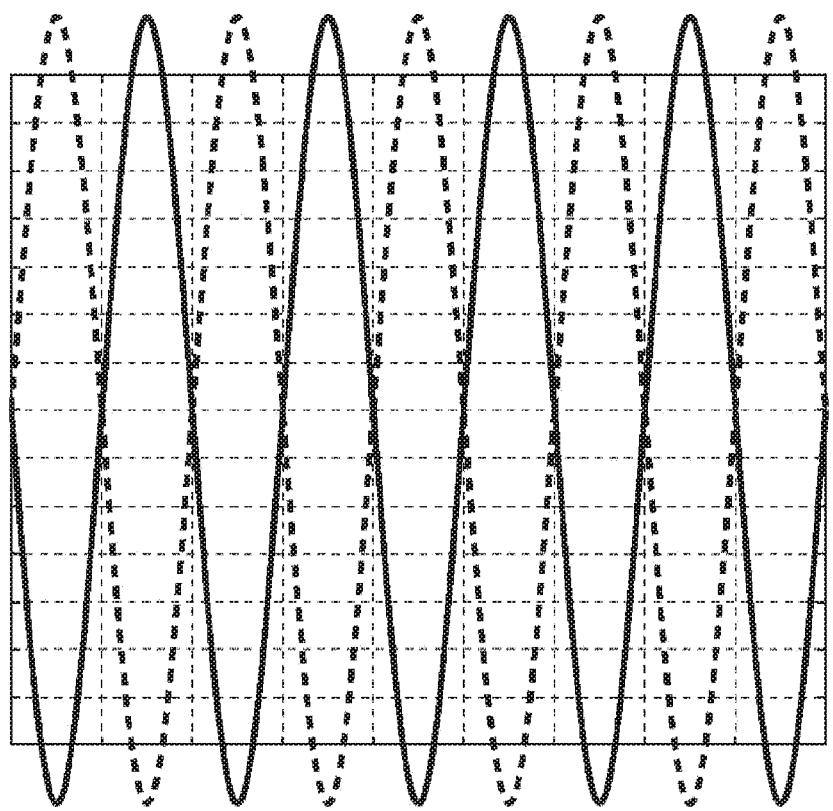
FIG. 7 is a diagram illustrating a state of laser beam scanning.

The MEMS driver 255 controls driving of the MEMS mirror 256 so as to project the image supplied from the video processor 251. The MEMS mirror 256 scans laser beam of individual colors, for example as illustrated in an example in FIG. 7, by driving the mirror mounted on the MEMS under the control of the MEMS driver 255. The laser beam is output to the outside of the apparatus from the projection port and emitted onto the screen 104, for example. With this configuration, the image supplied from the video processor 251 is projected onto the screen 104.

Note that in the description of an example in FIG. 6, there are three laser output units 253 and laser beams of three colors are output. Alternatively, the number of laser beams (or the number of colors) may be any number. For example, the number of laser output units 253 may be four or more, and may be two or less. In short, the number of laser beams output from the projection imaging apparatus 102 (the projection unit 202) may be two or less, and may be four or more. Moreover, the number of colors of the laser beams output from the projection imaging apparatus 102 (projection unit 202) may also be any numbers, namely, may be two or less, and may be four or more. Meanwhile, the configurations of the mirror 254 and the MEMS mirror 256 may be any configurations, not limited to the example in FIG. 6. Of course, the laser beam scanning pattern may be any pattern, not limited to the example in FIG. 7.

<Functional Blocks>

Figure 8:
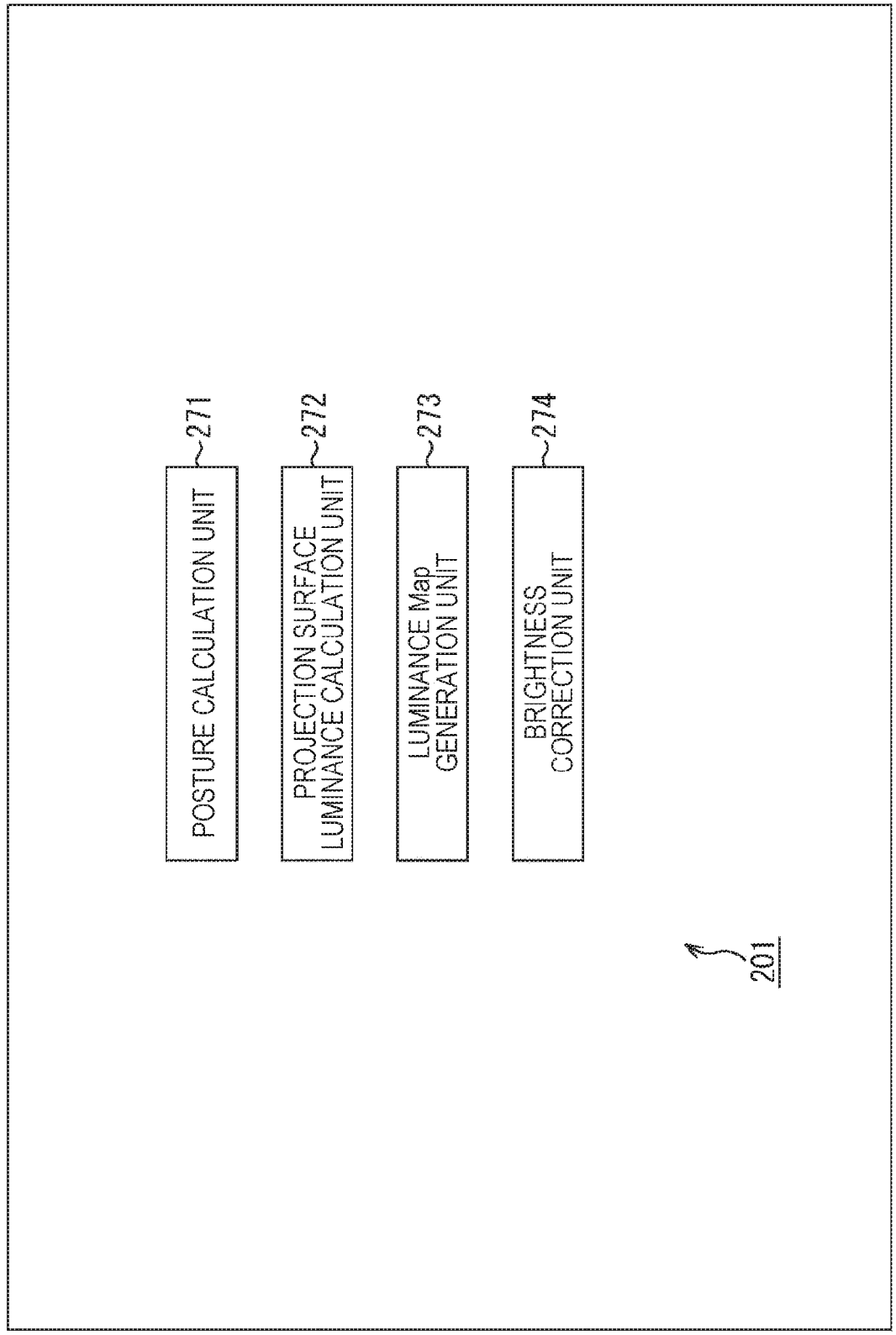
FIG. 8 is a block diagram illustrating an exemplary main configuration of a control section.

The control section 201 of the projection imaging apparatus 102 implements various functions by executing programs. FIG. 8 is a functional block diagram illustrating exemplary main functions implemented by the control section 201.

As illustrated in FIG. 8, the control section 201 includes functional blocks such as a posture calculation unit 271, a projection surface luminance calculation unit 272, a luminance map generation unit 273, and a brightness correction unit 274. The posture calculation unit 271 performs processing related to posture calculation for obtaining a relative posture (position and direction) between the projection imaging apparatus 102 and the projection surface (e.g. the screen 104).

The projection surface luminance calculation unit 272 performs processing related to calculation of brightness (luminance) of a projection image on a projection surface (e.g. the screen 104) on the basis of a distance from the projection unit 202 to the projection surface indicated in the relative posture obtained by the posture calculation unit 271.

The luminance map generation unit 273 performs processing related to generation of a luminance map, namely, map information on brightness (luminance) of the projection image on the projection surface, obtained by the projection surface luminance calculation unit 272.

The brightness correction unit 274 performs processing related to brightness correction using a luminance map, on the image to be projected.

<Flow of Processing Related to Calibration of Brightness Correction Amount>

Next, a flow of processing related to calibration of brightness correction amount, executed by individual apparatuses of the above-configured projection imaging system 100 will be described with reference to the flowchart in FIG. 9.

After the start of processing, the posture calculation unit 271 in each of the projection imaging apparatus 102-1 and the projection imaging apparatus 102-2 images the screen 104 (the projection image 105 projected on the screen 104) using the imaging unit 203 and performs posture calculation using the captured image (step S101 and step S121). At this time, a pixel correlative relationship (relative posture) between the projection unit 202 and the imaging unit 203 has been calibrated beforehand. Therefore, the position of the projection image 105 (namely, projection surface) is obtained from the captured image obtained by the imaging unit 203, using trigonometry, or the like. With this method, it is possible, for example, to obtain the distance from the projection unit 202 to the projection surface.

The projection surface luminance calculation unit 272 of each of the projection imaging apparatus 102-1 and the projection imaging apparatus 102-2 calculates (step S102 and step S122) brightness (luminance) of the projection image on the projection surface (e.g. the screen 104) on the basis of the posture calculation result, namely, the distance from the projection unit 202 to the projection surface. The projection surface luminance calculation unit 272 obtains the ratio of the luminance of the projection image on the projection surface, to a reference value (namely, luminance on the projection unit 202), using, for example, the inverse square law of luminance.

The luminance map generation unit 273 of each of the projection imaging apparatus 102-1 and the projection imaging apparatus 102-2 calculates (step S103 and step S123) luminance information of each of projection pixels using data including preliminarily calibrated characteristics of the projection unit 202, and determines the result as a luminance map millimeter system ([mm] system).

The communication unit 214 of each of the projection imaging apparatus 102-1 and the projection imaging apparatus 102-2 supplies information indicating a calculated posture calculation result (geometric calibration information) and generated luminance map, to the control unit 101 (step S104 and step S124).

In step S111, the communication unit 164 of the control unit 101 obtains the information (geometric calibration information and the luminance map) from each of the projection imaging apparatuses 102.

In step S112, the blending processing unit 181 performs blending calculation for obtaining the brightness correction value for each of the projection images in the overlap regions, using information obtained in step S111.

In step S113, the luminance map correction unit 182 corrects the luminance map of each of the projection imaging apparatuses 102 obtained in step S111, on the basis of blending calculation results in step S112.

In step S114, the communication unit 164 supplies an individual luminance map corrected in step S113, to the corresponding projection imaging apparatus 102 (supplier of the luminance map).

The communication unit 214 on each of the projection imaging apparatuses 102 obtains corrected luminance map (step S105 and step S125).

In step S115, the image processing unit 183 of the control unit 101 performs predetermined image processing on the image to be projected, and performs geometric correction in the form suitable for each of the projection imaging apparatuses 102.

In step S116, the communication unit 164 of the control unit 101 supplies image-processed image to the projection imaging apparatus 102-1 and the projection imaging apparatus 102-2 as image data in the millimeter [mm] system coordinates.

The communication unit 214 on each of the projection imaging apparatuses 102 obtains the corrected image data (step S106 and step S126).

The brightness correction unit 274 on each of the projection imaging apparatuses 102 performs brightness correction on the image data using the corrected luminance map (step S107 and step S127).

As described above, calibration of the correction amount related to brightness correction, and brightness correction using result of the calibration are performed. In this manner, the projection imaging system 100 (the control unit 101 and the projection imaging apparatus 102) can calibrate the correction amount in brightness correction more easily.

<Flow of Blending Processing>

Next, an exemplary flow of blending processing executed in step S112 in FIG. 9 will be described with reference to the flowchart in FIG. 10.

After the start of blending processing, the luminance correction map generation unit 191 generates, in step S141, a luminance correction map, namely, information to be used for correcting an α map of each of the projection imaging apparatuses 102, from luminance/color calibration information, namely, setting information related to pre-calibrated luminance and colors. This luminance correction map is map information indicating a correction value of the α map, for each of the pixels. In order to correct colors and aging on the projection imaging apparatus 102, the luminance correction map generation unit 191 performs pre-calibration on each of the projection imaging apparatuses 102 so as to obtain luminance/color calibration information. The luminance correction map generation unit 191 calculates correction values for aging and luminance spots using the obtained information.

In step S142, the α map generation unit 192 generates an α map of each of the projection imaging apparatuses 102 from geometric calibration information supplied from each of the projection imaging apparatuses 102. The α map is mixing ratio information related to the mixing ratio of each of the projection images regarding the overlap region 107 and is also map information indicating the mixing ratio for each of the pixels. Using all geometric calibration information, the α map generation unit 192 obtains how overlap regions are overlapping in the [mm] system coordinates, and generates an α map of each of the projection imaging apparatuses 102 (each of the projection images) on the basis of the obtained information.

In step S143, the luminance correction map correction unit 193 corrects the α map generated in step S142, using the luminance correction map generated in step S141.

In step S144, the blending calculation unit 194 performs blending calculation using the α map corrected in step S143. That is, processing to blend (mix) the projection images 105 with each other is performed. For example, the blending calculation unit 194 performs correction of brightness (luminance) and transmittance of the projection image 105.

Figure 9:
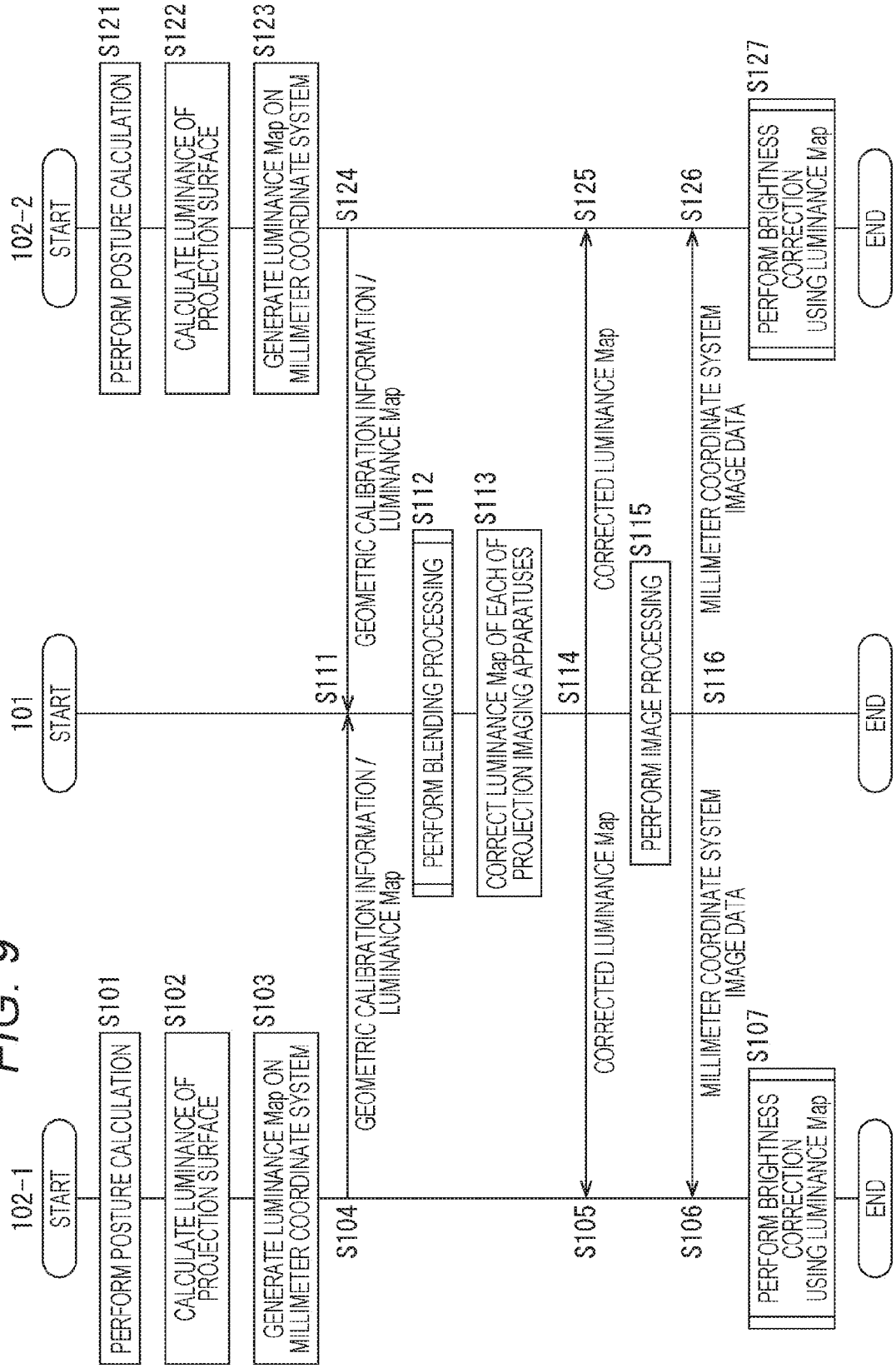
FIG. 9 is a flowchart illustrating an exemplary flow of processing related to calibration of brightness correction amount.

At completion of processing in step S144, the blending processing is finished and the processing returns to FIG. 9.

<Flow of Luminance Correction Map Generation Processing>

Next, an exemplary flow of luminance correction map generation processing executed in step S141 in FIG. 10 will be described with reference to the flowchart in FIG. 11.

When the luminance correction map generation processing is started, the luminance correction map generation unit 191 obtains, in step S161, a maximum luminance (total max) of each of the projection imaging apparatuses 102 using luminance/color calibration information.

In step S162, the luminance correction map generation unit 191 generates a luminance correction map of each of the projection imaging apparatuses 102 using the maximum luminance of each of the projection imaging apparatuses 102 obtained in step S161.

Figure 10:
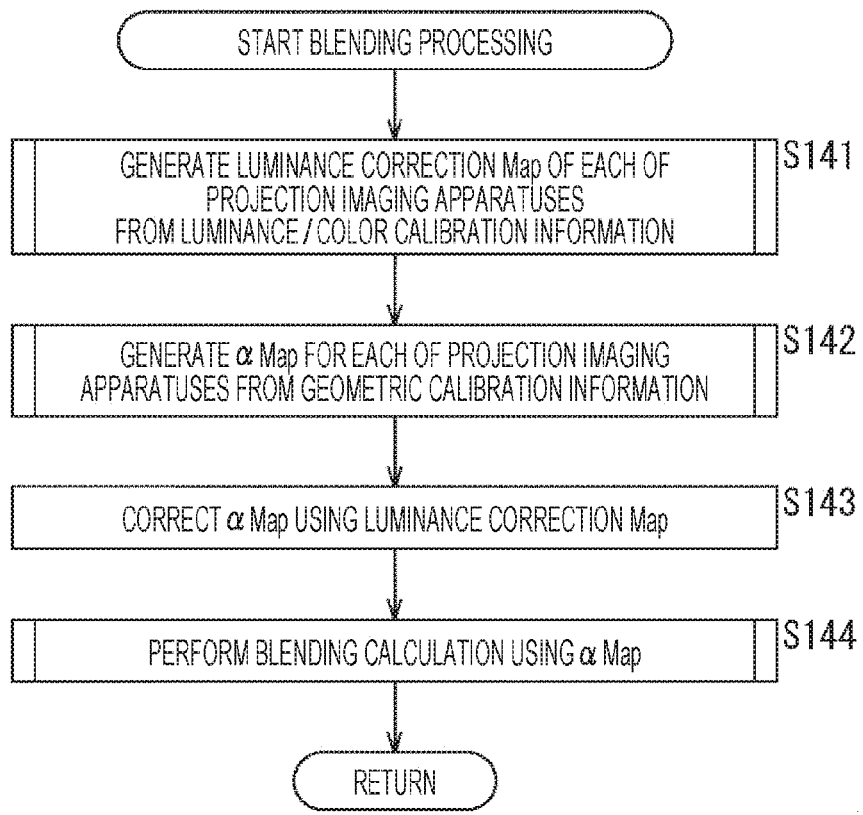
FIG. 10 is a flowchart illustrating an exemplary flow of blending processing.
Figure 11:
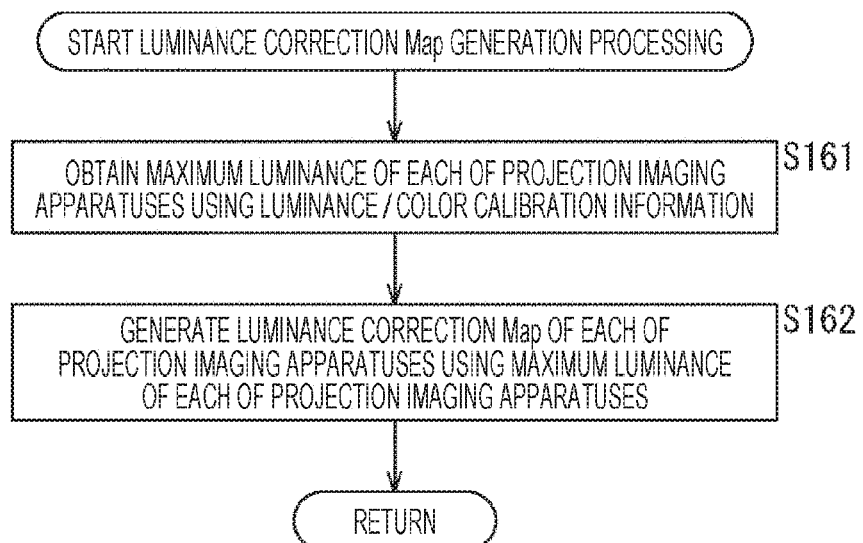
FIG. 11 is a flowchart illustrating an exemplary flow of luminance correction map generation processing.

After generation of the luminance correction map of each of the projection imaging apparatuses 102, the luminance correction map generation processing is finished and the processing returns to FIG. 10.

<Flow of α Map Generation Processing>

Figure 12:
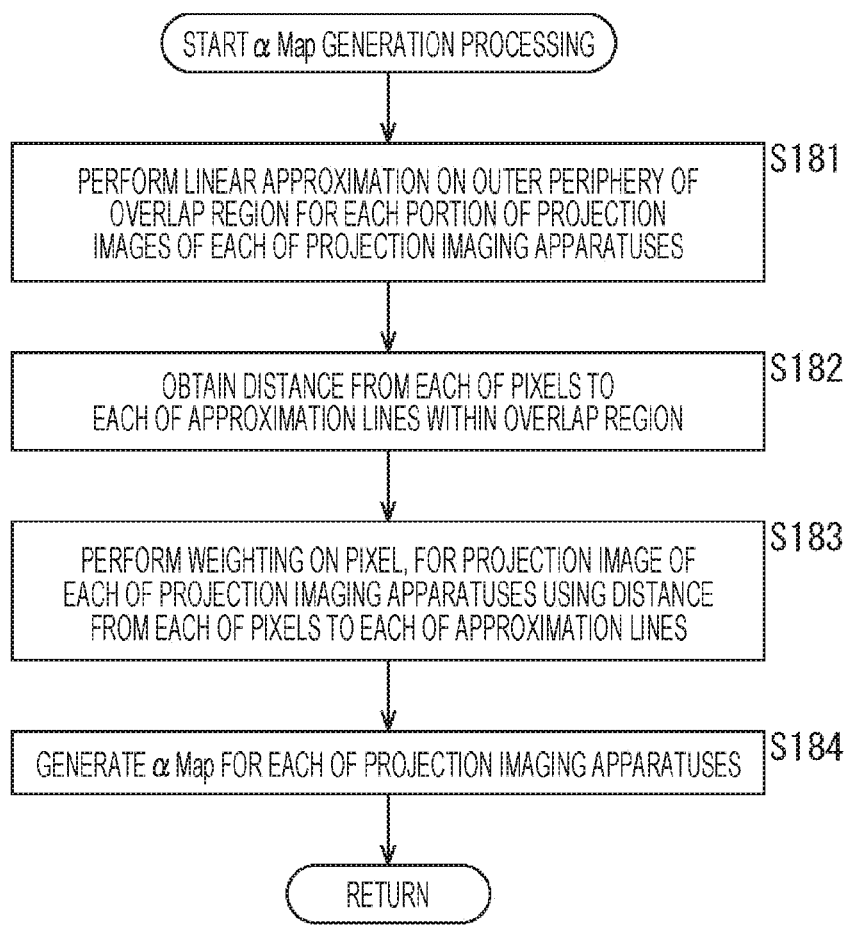
FIG. 12 is a flowchart illustrating an exemplary flow of α map generation processing.

Next, an exemplary flow of α map generation processing executed in step S142 in FIG. 10 will be described with reference to the flowchart in FIG. 12.

When the α map generation processing is started, the α map generation unit 192 performs, in step S181, linear approximation on outer periphery of the overlap region 107 for each portion of the projection images 105 of each of the projection imaging apparatuses 102. Specifically, the α map generation unit 192 performs linear approximation, using a line 1, on a portion of the projection image 105 of the projection imaging apparatus 102-1 at an outer periphery of the overlap region 107, and performs linear approximation, using a line 2, on a portion of the projection image 105 of the projection imaging apparatus 102-2 at an outer periphery of the overlap region 107.

In step S182, the α map generation unit 192 obtains a distance from each of the pixels to each of approximation lines within the overlap region 107.

In step S183, the α map generation unit 192 performs weighting on the pixel, for the projection image 105 of each of the projection imaging apparatuses 102 using the distance from each of the pixels to each of the approximation lines.

In step S184, the α map generation unit 192 generates an α map for each of the projection imaging apparatuses 102 in accordance with the weighting.

When the α map is generated, the α map generation processing is finished and the processing returns to FIG. 10.

<Flow of Blending Calculation Processing>

Figure 13:
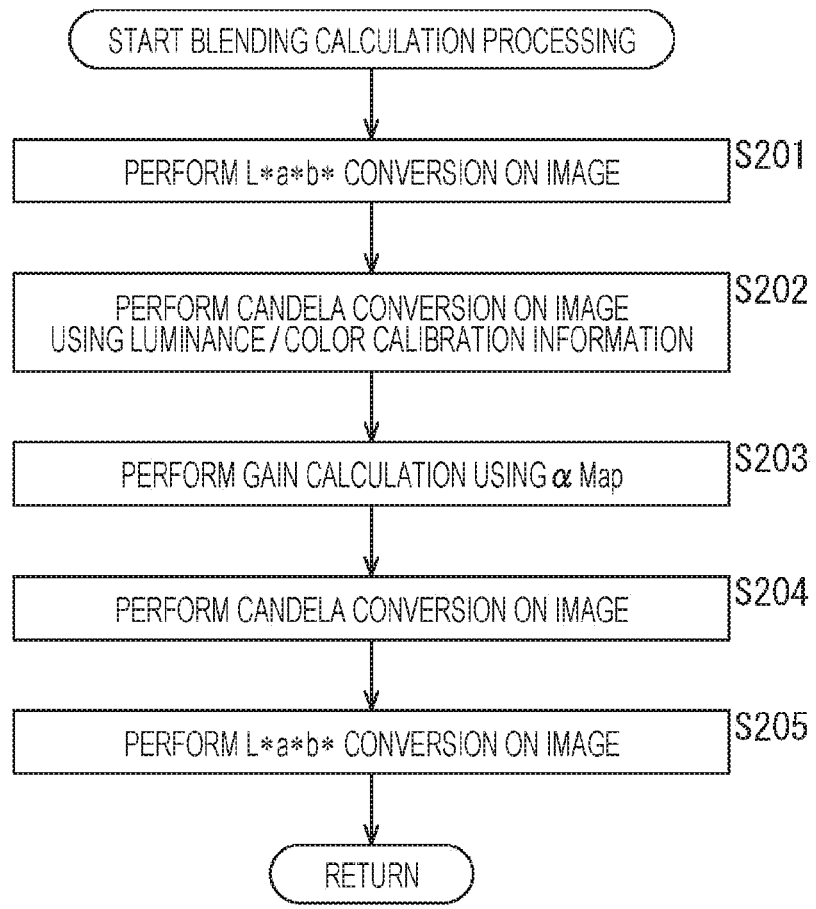
FIG. 13 is a flowchart illustrating an exemplary flow of blending calculation processing.

Next, an exemplary flow of blending calculation processing executed in step S144 in FIG. 10 will be described with reference to the flowchart in FIG. 13.

When the blending calculation processing is started, the blending calculation unit 194 performs, in step S201, L*a*b* conversion on the image. In step S202, the blending calculation unit 194 performs candela conversion on the image using luminance/color calibration information.

In step S203, the blending calculation unit 194 performs gain calculation using the α map corrected in step S143 in FIG. 10.

In step S204, the blending calculation unit 194 converts the image into candela values. In step S205, the blending calculation unit 194 performs L*a*b* conversion on the image.

At completion of processing in step S205, the blending calculation processing is finished and the processing returns to FIG. 10.

<Flow of Brightness Correction Processing>

Figure 14:
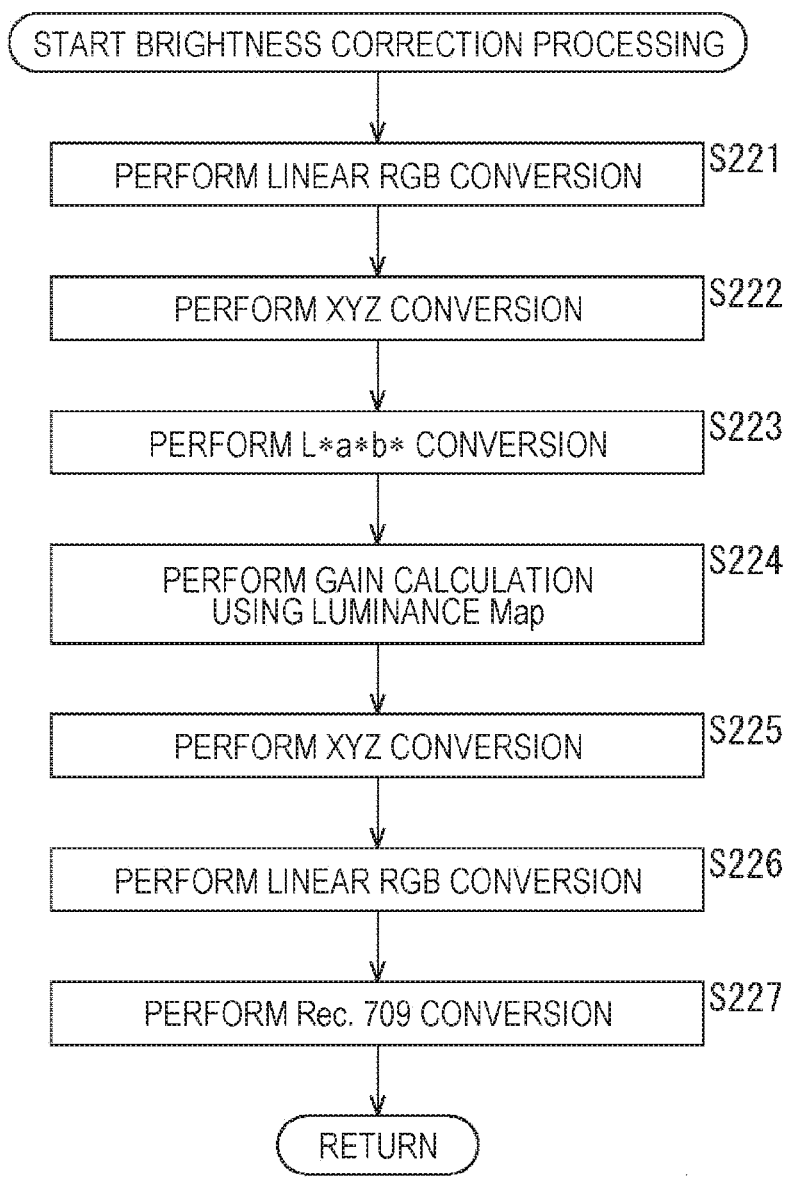
FIG. 14 is a flowchart illustrating an exemplary flow of brightness correction processing.

Next, an exemplary flow of brightness correction processing executed in step S107 and step S127 in FIG. 9 will be described with reference to the flowchart in FIG. 14. This processing assumes the input image format of RGB.

When the brightness correction processing is started, the brightness correction unit 274 performs linear RGB conversion in step S221. In step S222, the brightness correction unit 274 performs XYZ conversion. In step S223, the brightness correction unit 274 performs L*a*b* conversion. With the processing, the image is converted into a uniform perceptual color space.

In step S224, the brightness correction unit 274 performs gain calculation using the luminance map. Specifically, the luminance change ratio of each of pixels on the projector is obtained from geometric information, actual luminance on the projection surface coordinates is obtained from the calibration information of each of the projection imaging apparatuses 102 obtained beforehand, and the luminance value necessary for brightness correction is calculated from the actual luminance of the plurality of projection imaging apparatuses 102.

In step S225, the brightness correction unit 274 performs XYZ conversion. In step S226, the brightness correction unit 274 performs linear RGB conversion. In step S227, the brightness correction unit 274 performs Rec. 709 conversion.

At completion of processing in step S227, the brightness correction processing is finished and the processing returns to FIG. 9.

By execution of individual processing as described above, it is possible to obtain the distance with the projection surface using the captured image of the projection image and to perform calibration using the distance and calibration information of individual projection units. As a result, it is possible to perform calibration of correction amount in the brightness correction more easily and with higher accuracy.

In a known technique, it is difficult to determine how the overlap region is formed on the projection surface, and thus, manual adjustment is performed by the user, leading to difficulty in performing correction of curved forms in addition to simple rectangular forms. In contrast, according to the technique in the present disclosure as described above, it is possible to calculate a brightness correction value for any screen form without manual operation of the user.

Furthermore, by performing calibration of the characteristics of the projection imaging apparatus 102 beforehand, it is possible to perform correction in consideration of aging and uniformity, in brightness correction. In correction, since an actual luminance value is calculated after the uniform perceptual color space is used, it is possible to perform accurate luminance control on the projection surface, and to achieve brightness correction with less incompatible feeling occurring when viewed from all viewpoints, compared with brightness correction using a known technique, performed by a camera image viewed from a specific viewpoint.

Moreover, since geometric change information regarding the projection surface is obtained by using the imaging unit, and merely posture information is used in brightness correction, that is, since a brightness correction value is obtained using projector's projection characteristics obtained by calibration beforehand without using brightness obtained by the camera image, it is possible to easily perform brightness correction of the overlap regions without necessity of using a camera having high-performance sensor response characteristics in dark places.

Note that while the description above assumes that the α map is map information, there is no limitation, that is, the α map information needs not be map information. For example, it would be sufficient that information on each of the pixels can be obtained as a result of calculation, or the like. For example, the α map information may be a predetermined formula. Similar conditions can be applied also to the luminance map and the luminance correction map.

<Exemplary Configuration of Projection Imaging System>

Figure 15:
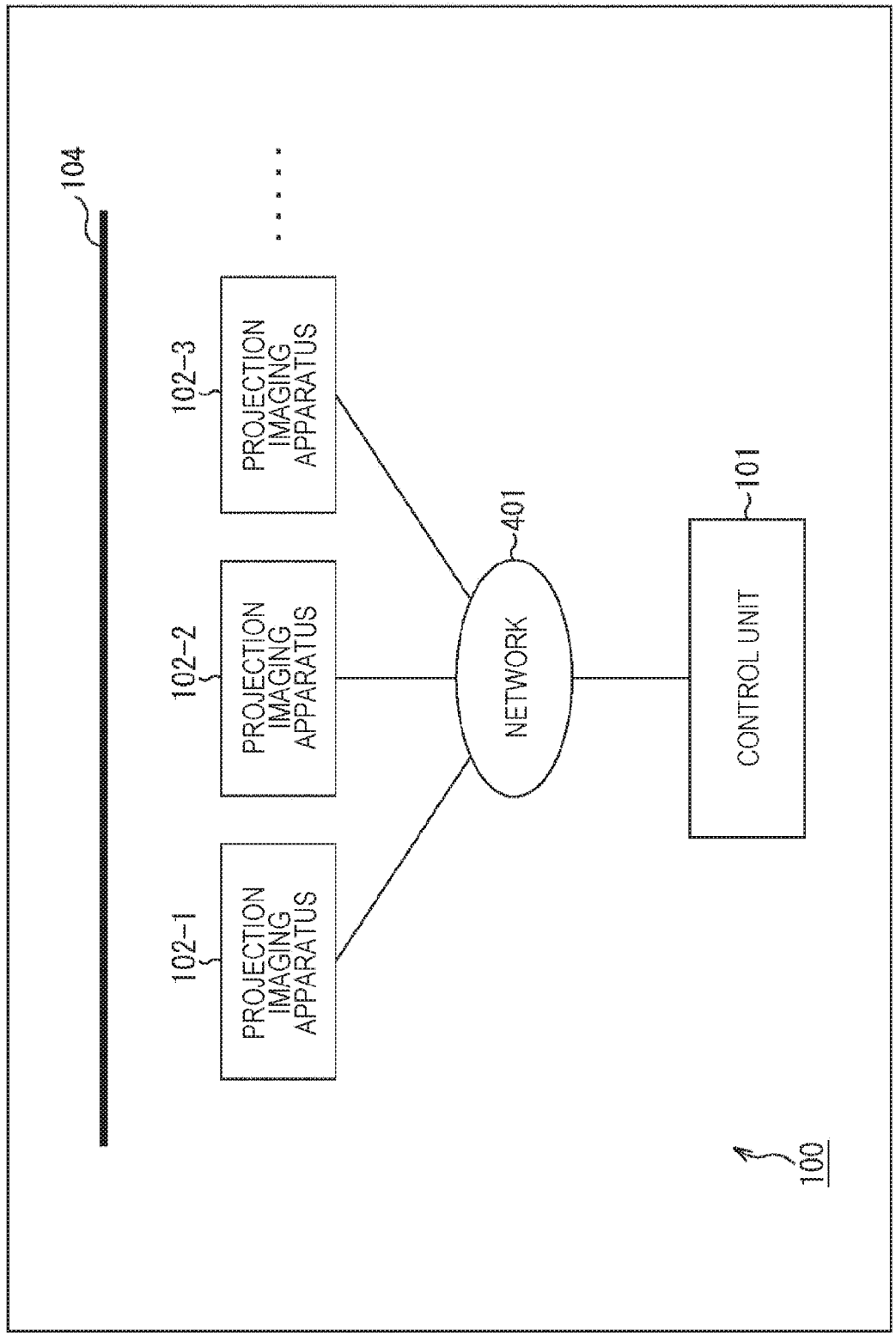
FIG. 15 is a diagram illustrating another exemplary main configuration of a projection imaging system.

The above-described configuration of the projection imaging system 100 is merely an example. That is, the projection imaging system 100 may have a configuration other than the above-described exemplary configuration. For example, the number of projection imaging apparatuses 102 that configures the projection imaging system 100 may be any number. For example, as illustrated in an example in FIG. 15, the number may be three or more (the projection imaging apparatus 102-1, the projection imaging apparatus 102-2, the projection imaging apparatus 102-3, . . . ). Moreover, as illustrated in an example in FIG. 15, each of the projection imaging apparatuses 102 (and the control unit 101) may be interconnected via a network 401, instead of the communication cable 103.

The network 401 is a communication network as a communication medium between the control unit 101 and the projection imaging apparatus 102. The network 401 may be any type of communication network, that is, may be wired communication network, wireless communication network, or may include both. For example, the network 401 may be a wired LAN, a wireless LAN, a public telephone network, a wide-area communication network for wireless mobile devices, such as a 3G network or a 4G network, an Internet, or the like, or a combination of these. Alternatively, the network 401 may be a single communication network, or a plurality of communication networks. Alternatively, part of the network 401 may include, for example, a predetermined standard communication cable such as a universal serial bus (USB) cable and a HDMI® cable.

In a case where three or more projection imaging apparatuses 102 are connected to the projection imaging system 100 in this manner, it would be sufficient that calibration of the correction amount in the above-described brightness correction is performed, similarly to the above-described examples, such that a calibration result for two of the projection imaging apparatuses 102 is assumed to be one virtual projection imaging apparatus 102, that is, it is allowable to use the calibration result recursively to be applied to all the projection imaging apparatuses 102.

<Flow of Processing Related to Calibration of Brightness Correction Amount>

Figure 16:
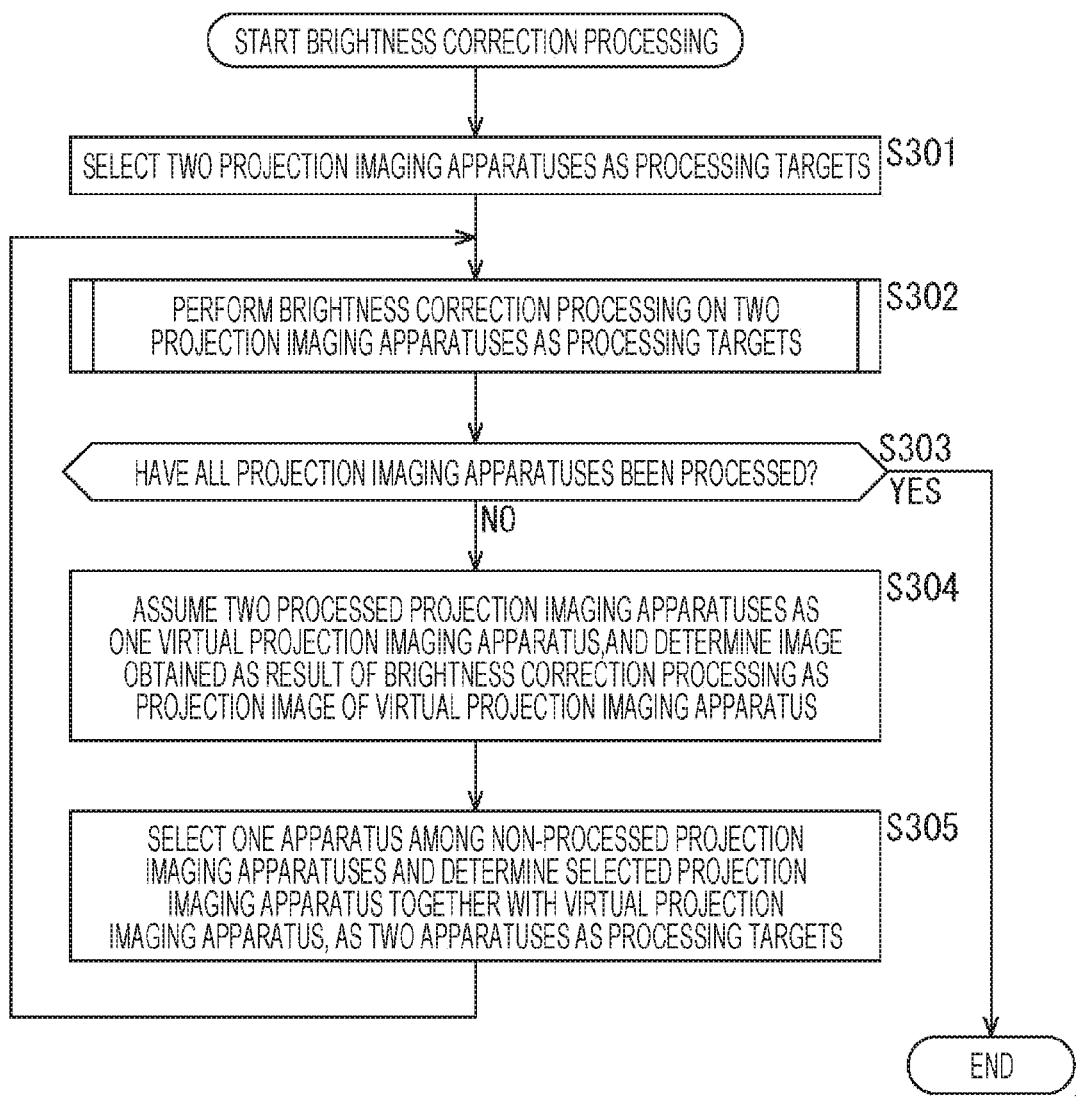
FIG. 16 is a flowchart illustrating another exemplary flow of brightness correction processing.

The flow of processing related to calibration of brightness correction amount in this case will be described with reference to the flowchart in FIG. 16.

When the processing related to calibration of brightness correction amount is started, the CPU 151 of the control unit 101 arbitrarily selects, in step S301, two projection imaging apparatuses 102 as processing targets, from among a group of projection imaging apparatuses 102 that belongs to the projection imaging system 100.

When two apparatuses are selected, the control unit 101 and the two selected projection imaging apparatuses 102 execute, in step S302, processing related to calibration of brightness correction amount. Since this processing is similar to the processing described with reference to the flowchart in FIG. 9, description will be omitted. That is, the correction amount is calibrated in a manner similar to the above-described example.

In step S303, the CPU 151 of the control unit 101 determines whether processing has been performed for all the projection imaging apparatuses 102. When it is determined that there is non-processed projection imaging apparatus 102, the processing moves on to step S304.

In step S304, the CPU 151 of the control unit 101 assumes the two processed projection imaging apparatuses 102 as one virtual projection imaging apparatus, and determines an image obtained as a result of brightness correction processing as a projection image of the virtual projection imaging apparatus 102.

In step S305, the CPU 151 of the control unit 101 selects one apparatus from among the non-processed projection imaging apparatuses 102, and determines the selected projection imaging apparatus 102 together with the virtual projection imaging apparatus, as two apparatuses as processing targets.

When the two apparatuses as processing targets are newly determined as above, the processing returns to step S302, and a series of succeeding processing is repeated.

Subsequently, in a case where it is determined, in step S303, that all the projection imaging apparatuses 102 have been processed, the processing related to calibration of brightness correction amount is finished.

By recursively performing processing using processing results as described above, it is possible to perform processing similarly to the above-described case, even when there are three or more projection imaging apparatuses 102. In short, it is possible to perform calibration of the correction amount in brightness correction more easily.

<Another Exemplary Configuration of Projection Imaging System>

Figure 17:
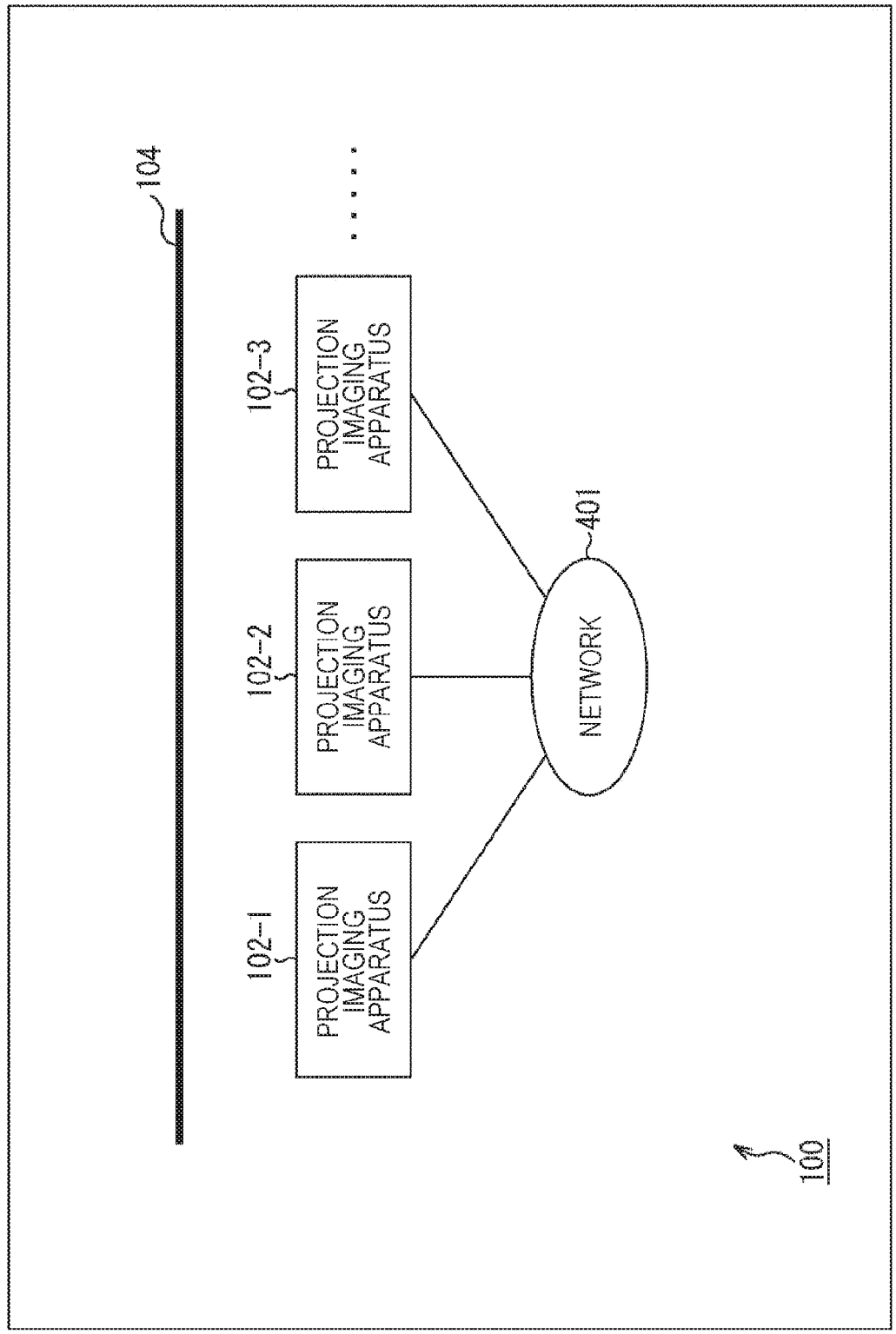
FIG. 17 is a diagram illustrating still another exemplary configuration of the projection imaging system.

Alternatively, it is allowable to configure such that the above-described various types of processing executed by the control unit 101 is partially or entirely executed outside the control unit 101. For example, it is allowable to configure such that the control unit 101 is omitted from the projection imaging system 100 as illustrated in the example in FIG. 17. In this case, it is allowable to configure to cause any of the projection imaging apparatuses 102 to execute the above-described various types of processing executed by the control unit 101. Alternatively, it is allowable to configure such that the plurality of projection imaging apparatuses 102 operates in cooperation and executes various types of processing executed by the control unit 101 by sharing it among the plurality of apparatuses.

Figure 18:
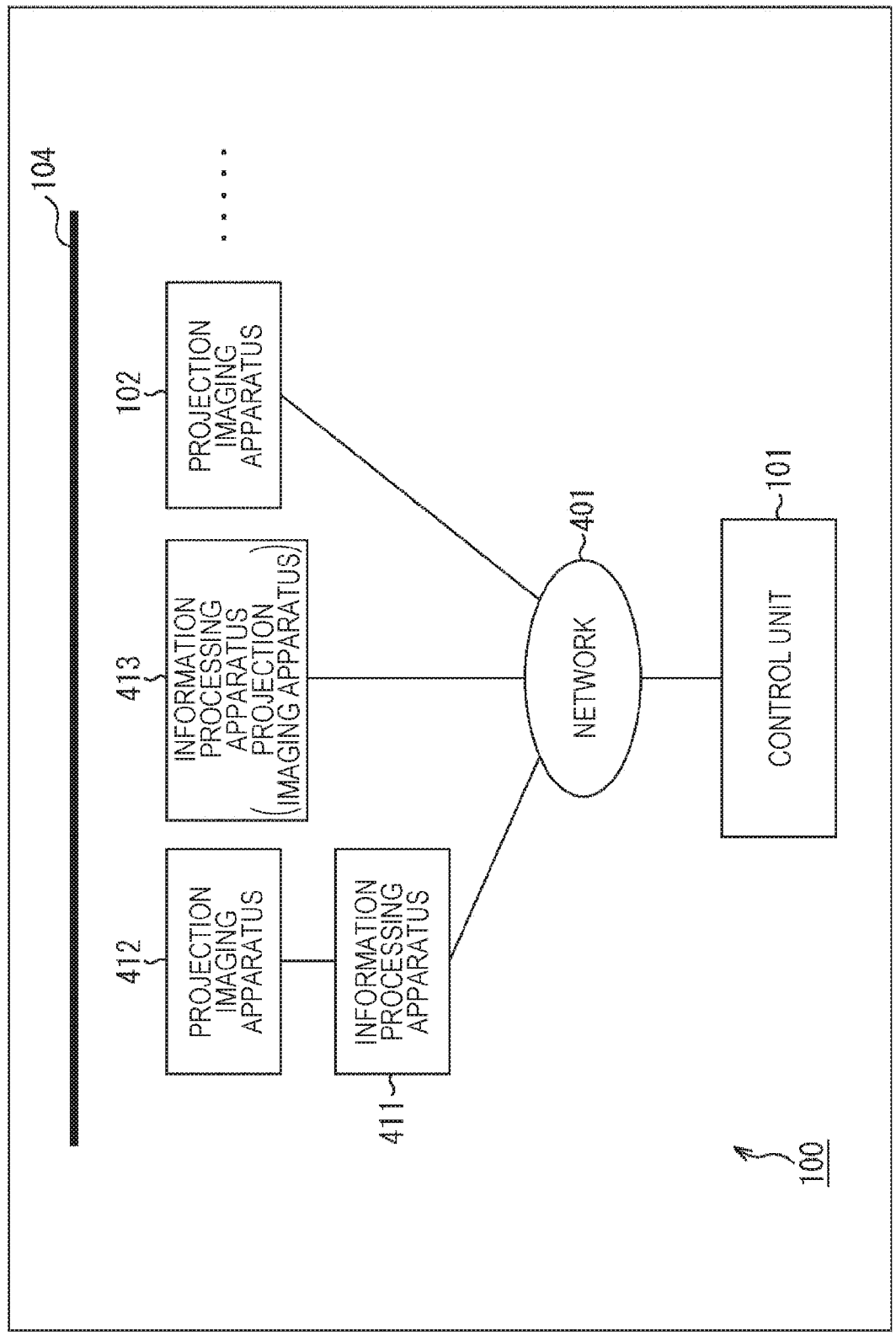
FIG. 18 is a diagram illustrating still another exemplary configuration of the projection imaging system.

Alternatively, as indicated by an projection imaging apparatus 412 illustrated in FIG. 18, the projection imaging apparatus 412 may be configured to be connected with the network 401 (including the control unit 101 and the other projection imaging apparatus 102) via another information processing apparatus 411. The projection imaging apparatus 412 is similar to the above-described projection imaging apparatus 102, except that the projection imaging apparatus 412 is connected to the network 401 via the information processing apparatus 411 having a communication function, such as a mobile-type telephone device, a smartphone, a tablet computer, and a notebook computer. Moreover, the projection imaging apparatus 412 is driven under the control of the information processing apparatus 411. With this configuration, it is possible to cause the information processing apparatus 411, which has originally high processing capabilities, to perform processing related to communication and processing related to control of projection and imaging. Accordingly, it is possible to suppress an increase of functions (information processing capacity, etc.) needed for the projection imaging apparatus 412, and thus, to suppress an increase of cost.

Alternatively, it is also allowable to provide the functions of the projection imaging apparatus 102 as a module, or the like (namely, in a unit of component). An information processing apparatus 413 illustrated in FIG. 18 corresponds to an information processing apparatus that has originally high processing capabilities, such as a mobile-type telephone device, a smartphone, a tablet computer, and a notebook computer, that incorporates a module having functions of the above-described projection imaging apparatus 102. In short, the information processing apparatus 413 has both functions of the information processing apparatus 411 and functions of the projection imaging apparatus 412. The projection imaging apparatus 102 can be implemented as this type of information processing apparatus.

Alternatively, as illustrated in the example in FIG. 18, it is allowable to configure such that devices having mutually different functions are mixed as the projection imaging apparatuses 102.

Figure 19:
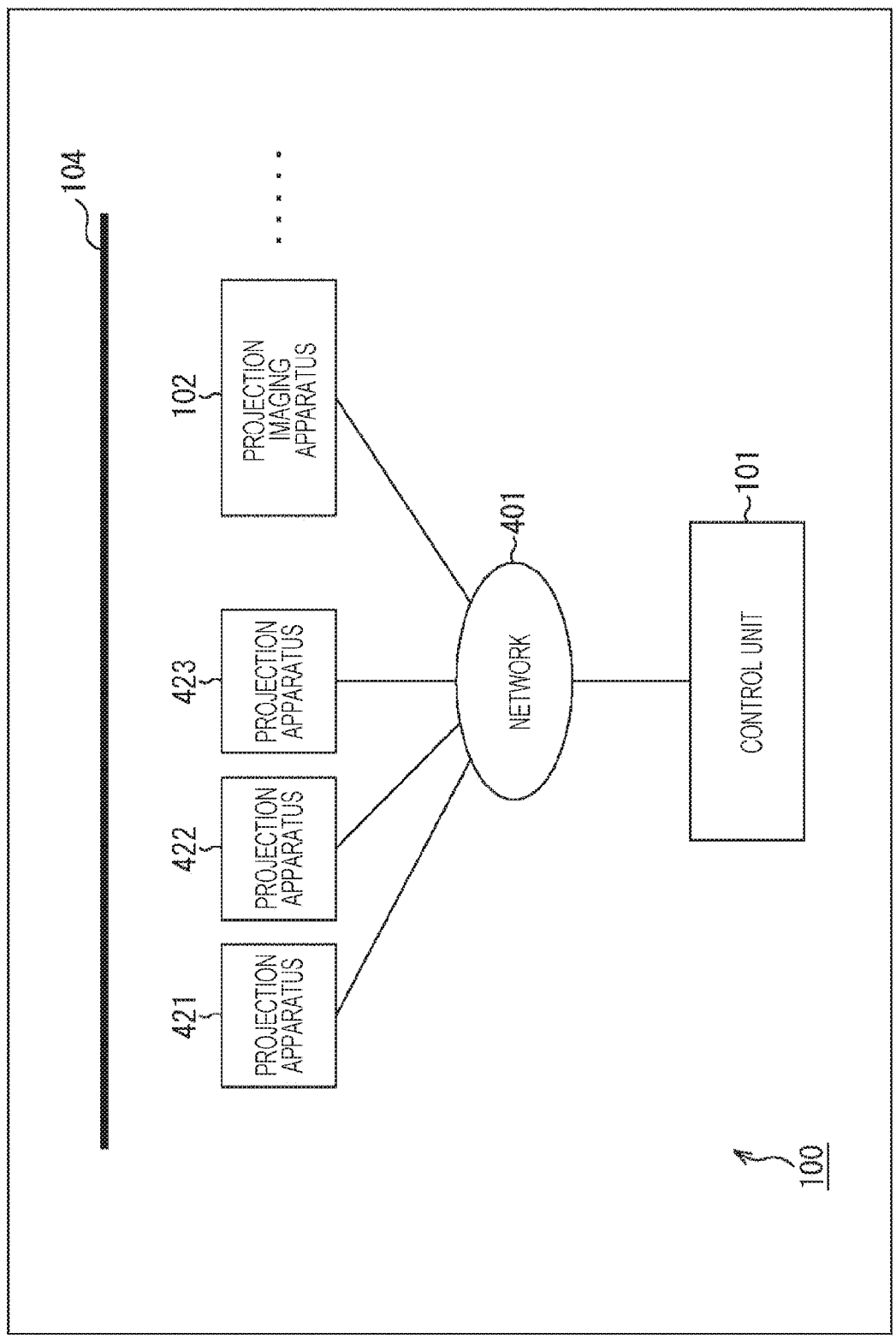
FIG. 19 is a diagram illustrating still another exemplary configuration of the projection imaging system.

Alternatively, as illustrated in the example in FIG. 19, the projection imaging system 100 may include a projection apparatus 421 (or a projection apparatus 423) having the projection unit 202 alone, or may include an imaging apparatus 422 having the imaging unit 203 alone. Alternatively, it is also allowable to configure such that the plurality of projection units 202 and imaging units 203 on one device. Furthermore, the number of projection units 202 and the number of imaging units 203 need not be the same on the entire projection imaging system 100.

A series of processing described above can be executed either in hardware or with software. In a case where the series of processing is executed with software, a program constituting the software is installed from a network or from a recording medium.

As illustrated in FIGS. 2 and 5, an exemplary recording medium includes the removable medium 171 and the removable medium 221 in which a program is recorded, delivered in order to provide the program to the user separately from an apparatus main body. The removable medium 171 and the removable medium 221 may include a magnetic disk (including a flexible disk) and an optical disk (including a CD-ROM and a DVD). Also a magneto-optical disk (including a mini disc (MD)) and a semiconductor memory may be included.

In this case, in the control unit 101, for example, the program can be installed in the storage unit 163 by attaching the removable medium 171 to the drive 165. Additionally, in the projection imaging apparatus 102, for example, the program can be installed in the storage unit 213 by attaching the removable medium 221 to the drive 215.

Alternatively, the program can be provided via a wired or wireless transmission medium including a local area network, an Internet, and digital satellite broadcasting. In this case, in the control unit 101, for example, the program can be received at the communication unit 164 and be installed in the storage unit 163. Additionally, in the projection imaging apparatus 102, for example, the program can be received at the communication unit 214 and be installed in the storage unit 213.

Alternatively, the program can be installed in the storage unit, a ROM, or the like, beforehand. For example, in the case of the control unit 101, the program can be installed in the storage unit 163, a ROM 153, or the like, beforehand. Moreover, for example, in the case of the projection imaging apparatus 102, the program can be installed in a ROM or the like, in the storage unit 213 or the control section 201, beforehand.

Note that the program executed by the computer may be a program processed in a time series in an order described in the present description, or can be a program processed in required timing such as being called.

In the present specification, each of the steps describing the program recorded on the recording medium includes not only processing performed in time series along the described order, but also processing executed in parallel or separately, when it is not necessarily processed in time series.

Additionally, the processing in the above-described steps can be executed on each of the above-described apparatuses or on any apparatus other than the above-described apparatuses. In this case, it would be sufficient that the apparatus that executes the processing has the above-described functions (functional blocks, or the like) needed for executing the processing. In addition, it would be sufficient that the information needed for processing is transmitted to the apparatus appropriately.

Moreover, in the present description, the system represents a set of a plurality of constituents (devices, modules (parts), or the like). In other words, all the constituents may be in a same housing but they do not have to be in the same housing. Accordingly, a plurality of apparatuses, in separate housings, connected via a network can be a system. An apparatus in which a plurality of modules is housed in one housing can also be a system.

Alternatively, a configuration described above as a single apparatus (or processing unit) may be divided and configured as a plurality of apparatuses (or processing units). Conversely, a configuration described above as a plurality of devices (or processing units) may be collected and configured as a single device (or processing unit). In addition, configurations other than the above-described configurations may, of course, be added to the configurations of the apparatuses (or the processing units). Furthermore, as long as configurations or operation are substantially the same in the entire system, the configurations of certain apparatuses (or processing units) may be partially included in the configurations of the other apparatuses (or other processing units)

Hereinabove, the preferred embodiments of the present disclosure have been described above with reference to the accompanying drawings, while the technical scope of the present disclosure is not limited to the above examples. A person skilled in the art in the technical field of the present disclosure may find it understandable to reach various alterations and modifications within the technical scope of the appended claims, and it should be understood that they will naturally come within the technical scope of the present disclosure.

For example, the present technology can be configured as a form of cloud computing in which one function is shared in cooperation for processing among a plurality of devices via a network.

In addition, each of steps described in the above flowcharts can be executed on one device or shared by a plurality of devices for processing.

Furthermore, when one step includes a plurality of stages of processing, the plurality of stages of processing included in the one step can be executed on one device or can be shared by a plurality of devices.

Moreover, the present technology is not limited to this example and can be implemented as any configuration mounted in the apparatuses, or apparatuses constituting the systems, for example, processors in the form of system large scale integration (LSI), modules that use a plurality of processors, units that use a plurality of modules, sets obtained by further adding other functions to the units (namely, a partial configuration of the devices), or the like.

Note that the present technology may also be configured as below.

(1) An image processing apparatus including a blending calculation unit configured to perform blending calculation for correcting brightness of an image in accordance with a distance from a projection unit configured to project the image to a projection surface onto which the image is projected, and with a characteristic of the projection unit.

(2) The image processing apparatus according to (1), in which the blending calculation unit performs the blending calculation for each of projection images, which are projected onto the projection surfaces by a plurality of projection units, at least partially overlapping with each other.

(3) The image processing apparatus according to (2), in which the blending calculation unit performs the blending calculation in accordance with the distance from the projection unit to the projection surface, using mixing ratio information related to a mixing ratio of each of the images, regarding a region in which the projection images overlap with each other.

(4) The image processing apparatus according to (3), in which the mixing ratio information is map information representing the mixing ratio for each of pixels.

(5) The image processing apparatus according to (3) or (4), in which the blending calculation unit performs the blending calculation using the mixing ratio information in a uniform perceptual color space.

(6) The image processing apparatus according to any of (3) or (5), further including a mixing ratio information generation unit configured to generate the mixing ratio information, in which the blending calculation unit performs the blending calculation using the mixing ratio information generated by the mixing ratio information generation unit.

(7) The image processing apparatus according to (3) or (6), further including a mixing ratio information correction unit configured to correct the mixing ratio information in accordance with the characteristic of the projection unit, in which the blending calculation unit performs the blending calculation using the mixing ratio information corrected by the mixing ratio information correction unit.

(8) The image processing apparatus according to (7) further including a correction information generation unit configured to generate correction information for correcting the mixing ratio information in accordance with the characteristic of the projection unit, in which the mixing ratio information correction unit corrects the mixing ratio information using the correction information generated by the correction information generation unit.

(9) The image processing apparatus according to (8), in which the correction information is map information representing a correction value of the mixing ratio for each of pixels.

(10) The image processing apparatus according to any of (1) to (9), further including a luminance information correction unit configured to correct luminance information related to brightness of the image for each of the projection units on the basis of the image for which brightness has been corrected by the blending calculation performed by the blending calculation unit.

(11) The image processing apparatus according to (10), in which the luminance information is information related to brightness of the image determined on the basis of the distance from the projection unit to the projection surface.

(12) The image processing apparatus according to (11), in which the luminance information is map information representing brightness of the image for each of pixels.

(13) The image processing apparatus according to any of (10) to (12), further including an image correction unit configured to correct brightness of the image to be projected, using the luminance information corrected by the luminance information correction unit.

(14) The image processing apparatus according to (13), in which the image correction unit corrects brightness of the image in the uniform perceptual color space.

(15) The image processing apparatus according to (13) or (14) further including a projection unit configured to project the image for which brightness has been corrected by the image correction unit.

(16) The image processing apparatus according to any of (10) to (15) further including a luminance information generation unit configured to generate the luminance information on the basis of the distance from the projection unit to the projection surface, in which the luminance information correction unit corrects the luminance information generated by the luminance information generation unit.

(17) The image processing apparatus according to (16) further including a distance calculation unit configured to calculate the distance from the projection unit to the projection surface on the basis of the captured image of the projection image projected on the projection surface, in which the luminance information generation unit generates the luminance information on the basis of the distance from the projection unit to the projection surface, calculated by the distance calculation unit.

(18) The image processing apparatus according to (17), in which the distance calculation unit calculates the distance from the projection unit to the projection surface on the basis of the captured image obtained by imaging by an imaging unit provided in the vicinity of the projection unit.

(19) The image processing apparatus according to (17) or (18) further including the imaging unit, in which the distance calculation unit calculates the distance from the projection unit to the projection surface on the basis of the captured image obtained by imaging by an imaging unit.

(20) An image processing method including performing blending calculation for correcting brightness of an image in accordance with a distance from a projection unit configured to project the image to a projection surface onto which the image is projected, and in accordance with a characteristic of the projection unit.

REFERENCE SIGNS LIST 100 projection imaging system
101 control unit
102 projection imaging apparatus
103 communication cable
104 screen
105 projection image
107 overlap region
151 CPU
181 blending processing unit
182 luminance map correction unit
183 image processing unit
191 luminance correction map generation unit
192 α map generation unit
193 luminance correction map correction unit
194 blending calculation unit
201 control section
202 projection unit
203 imaging unit
251 video processor
252 laser driver
253 laser output unit
254 mirror
255 MEMS driver
256 MEMS mirror
271 posture calculation unit
272 projection surface luminance calculation unit luminance map generation unit
274 brightness correction unit
401 network
411 information processing apparatus
412 projection imaging apparatus
413 information processing apparatus
421 projection apparatus
422 imaging apparatus
423 projection apparatus

The invention claimed is:

1. An image processing apparatus, comprising:
one or more processors configured to:
calculate a distance from each of a plurality of projection units to a projection surface on which a plurality of images are projected by the plurality of projection units; and
correct, by a blending calculation, brightness of each of the plurality of images based on the calculated distance and based on a characteristic of each of the plurality of projection units,
wherein the blending calculation is based on mixing ratio information related to a mixing ratio of each of the plurality of images in a region in which the plurality of images partially overlap with each other.

2. The image processing apparatus according to claim 1, wherein the one or more processors are further configured to execute the blending calculation for each of the plurality of images, which are projected onto the projection surface by the plurality of projection units.

3. The image processing apparatus according to claim 1, wherein the mixing ratio information is map information representing the mixing ratio for each pixel of each of the plurality of images.

4. The image processing apparatus according to claim 1, wherein the one or more processors are further configured to execute the blending calculation based on the mixing ratio information in a uniform perceptual color space.

5. The image processing apparatus according to claim 1, wherein the one or more processors are further configured to:
generate the mixing ratio information; and
execute blending calculation based on the generated mixing ratio information.

6. The image processing apparatus according to claim 1, wherein the one or more processors are further configured to:
correct the mixing ratio information based on the characteristic of each of the plurality of projection units; and
execute the blending calculation based on the corrected mixing ratio information.

7. The image processing apparatus according to claim 6, wherein the one or more processors are further configured to:
generate correction information to correct the mixing ratio information based on the characteristic of each of the plurality of projection unit; and
correct the mixing ratio information based on the generated correction information.

8. The image processing apparatus according to claim 7, wherein the correction information is map information representing a correction value of the mixing ratio for each pixel of each of the plurality of images.

9. The image processing apparatus according to claim 1, wherein the one or more processors are further configured to correct luminance information related to the brightness of each of the plurality of images for each of the plurality of projection units based on an image of the plurality of images for which the brightness has been corrected.

10. The image processing apparatus according to claim 9, wherein the luminance information is related to the brightness of each of the plurality of images determined based on the calculated distance from each of the plurality of projection units to the projection surface.

11. The image processing apparatus according to claim 10, wherein the luminance information is map information representing brightness of each of the plurality of images for each pixel of a plurality of pixels.

12. The image processing apparatus according to claim 9, wherein the one or more processors are further configured to correct the brightness of each of the plurality of images based on the corrected luminance information.

13. The image processing apparatus according to claim 12, wherein the one or more processors are further configured to correct the brightness of each of the plurality of images in a uniform perceptual color space.

14. The image processing apparatus according to claim 12, wherein the one or more processors are further configured to project each of the plurality of images for which the brightness has been corrected.

15. The image processing apparatus according to claim 9, wherein the one or more processors are further configured to:
generate the luminance information based on the distance from each of the plurality of projection units to the projection surface; and
correct the generated luminance information.

16. The image processing apparatus according to claim 15, wherein the one or more processors are further configured to:
calculate the distance from each of the plurality of projection units to the projection surface based on a captured image of each of the plurality of images,
generate the luminance information based on the calculated distance.

17. The image processing apparatus according to claim 16, wherein the distance is calculated based on the captured image obtained by an imaging device in a vicinity of each of the plurality of projection units.

18. The image processing apparatus according to claim 16, further comprising an imaging device, wherein the distance is calculated from each of the plurality of projection units to the projection surface based on the captured image obtained by the imaging device.

19. An image processing method, comprising:
calculating a distance from each of a plurality of projection units to a projection surface on which a plurality of images are projected by the plurality of projection units, and
correcting, by a blending calculation, brightness of each of the plurality of images based on the calculated distance and based on a characteristic of each of the plurality of projection units,
wherein the blending calculation is based on mixing ratio information related to a mixing ratio of each of the plurality of images in a region in which the plurality of images partially overlap with each other.

* * * * *